US012808471B2

(12) United States Patent
Untch

(10) Patent No.: US 12,808,471 B2
(45) Date of Patent: Nov. 24, 2026

(54) CONNECTING DEVICE FOR CONNECTING A FIRST PIPE END TO A SECOND PIPE END

(71) Applicant: U-Consulting Gmbh, Wolfertschwenden (DE)

(72) Inventor: Günter Untch, Badenweiler (DE)

(73) Assignee: U-CONSULTING GMBH, Wolfertschwenden (DE)

( * ) Notice: Subject to any disclaimer, the term of this patent is extended or adjusted under 35 U.S.C. 154(b) by 0 days.

(21) Appl. No.: 19/183,457

(22) Filed: Apr. 18, 2025

(65) Prior Publication Data

US 2026/0251252 A1 Aug. 27, 2026

Related U.S. Application Data

(62) Division of application No. 18/281,200, filed as application No. PCT/EP2021/084851 on Dec. 8, 2021, now Pat. No. 12,492,770.

(30) Foreign Application Priority Data

Mar. 10, 2021 (DE) ..................... 10 2021 105 817.1

(51) Int. Cl.
*F16L 37/113* (2006.01)
*F16L 23/04* (2006.01)
(Continued)

(52) U.S. Cl.
CPC ............ *F16L 37/113* (2013.01); *F16L 23/04* (2013.01); *F16L 37/127* (2013.01);
(Continued)

(58) Field of Classification Search
CPC ..... F16L 37/086; F16L 37/096; F16L 37/127; F16L 37/24; F16L 37/107; F16L 37/113;
(Continued)

(56) References Cited

U.S. PATENT DOCUMENTS 263,863 A * 9/1882 Converse .................. F16L 9/08 285/369
623,416 A * 4/1899 McCrory .............. F16L 37/025 285/370
(Continued)

FOREIGN PATENT DOCUMENTS

DE 3830241 A1 6/1989
DE 39 01 425 A1 7/1990
(Continued)

OTHER PUBLICATIONS

International Search Report and Written Opinion issued Jul. 20, 2022 in International Application No. PCT/EP2021/084851.

*Primary Examiner* — Aaron M Dunwoody
(74) *Attorney, Agent, or Firm* — Panitch Schwarze Belisario & Nadel LLP

(57) ABSTRACT

A connection device for connecting first and second line ends having first and second connection sections, respectively. The connection device includes a first connection member having a first counter-connection section being connectable to the first line end using the first connection section, the first counter-connection section and a first locking section. A second connection member having a second counter-connection section being connectable to the second line end using the second connection section, the second counter-connection section and second locking section. A locking member defines a longitudinal axis and has a first counter-locking section by which the locking member is connectable using the first locking section to the first connection member. The connection between the locking member and the first connection member and/or the locking member and the first connection member is releasable.

9 Claims, 16 Drawing Sheets

(51) Int. Cl.

| | |
|---|---|
| ***F16L 37/127*** | (2006.01) |
| *F16L 37/086* | (2006.01) |
| *F16L 37/096* | (2006.01) |
| *F16L 37/23* | (2006.01) |

(52) U.S. Cl.
CPC ........... *F16L 37/086* (2013.01); *F16L 37/096* (2013.01); *F16L 37/23* (2013.01)

(58) Field of Classification Search
CPC ..... F16L 37/248; F16L 37/252; F16L 37/244; F16L 37/10; F16L 37/101
See application file for complete search history.

(56) References Cited

U.S. PATENT DOCUMENTS

| | | | |
|---|---|---|---|
| 2,919,144 | A | 12/1959 | Lindenmeyer |
| 3,138,393 | A | 6/1964 | Livingston |
| 5,149,143 | A | 9/1992 | Howell |
| 10,400,925 | B2 | 9/2019 | Pendleton |

FOREIGN PATENT DOCUMENTS

| | | | |
|---|---|---|---|
| DE | 10 2012 007 145 | A1 | 10/2013 |
| EP | 1245894 | A1 | 10/2002 |
| EP | 2761213 | B1 | 4/2018 |
| WO | 2019238920 | A2 | 12/2019 |

* cited by examiner

CONNECTING DEVICE FOR CONNECTING A FIRST PIPE END TO A SECOND PIPE END

CROSS-REFERENCE TO RELATED APPLICATIONS

This application is a divisional of U.S. patent application Ser. No. 18/281,200, filed Sep. 8, 2023, which is a Section 371 of International Application No. PCT/EP2021/084851, filed Dec. 8, 2021, which was published in the German language on Sep. 15, 2022 under International Publication No. WO 2022/189020 A1, which claims priority under 35 U.S.C. § 119 (b) to German Patent Application No. 10 2021 105 817.1, filed Mar. 10, 2021, the disclosures of which are incorporated herein by reference in their entireties.

BACKGROUND OF THE INVENTION

The present invention relates to a connection device for connecting a first line end to a second line end.

So-called tri-clamps are known as standardized terminal clamps for connecting line ends, for example tube ends or line ends, to or with one another. A tri-clamp is understood as a foldable terminal clamp or connection clamp having two axially spaced apart clamping flanges that are aligned slanted slightly toward one another so that a radially inwardly expanding, wedge-shaped annular space is formed between them. Such a tri-clamp is suitable for an aseptic installation of two line ends that each have flange-like radial extensions, also called contact flanges, arranged respectively terminally and whose respective front faces contact one another. The terminal clamp is folded around the mutually contacting radial extensions such that the clamping flanges contact the respective back faces of the radial extensions. The force used to fold together the terminal clamp is deflected via the chamfers of the terminal clamp into an axial force that acts as a pressing force on the mutually contacting front faces of the radial extensions. To maintain the terminal clamp in the folded together state, its free ends are connectable to one another. Screw connections are typically used for this purpose. Latch connections are provided for this purpose in U.S. Pat. No. 8,328,457 B2 and DE Patent Application Publication No. 10 2016 108 905 A1.

It is a disadvantage with the tri-clamps that they are comparatively difficult to close and open again. The time effort required for this is in particular particularly large when a tri-clamp has to be closed or opened by a single person. The increased time effort is in particular disadvantageous when the lines that are connected to one another by a tri-clamp have to be frequently cleaned, for which purpose the tri-clamp has to be opened.

When the lines that are connected to one another by a tri-clamp are used for transporting toxic substances, in particular in particulate from, it must be ensured that no or only very small amounts of these toxic substances can enter into the environment. For this purpose, so-called secondary interfaces are used by which tubular sheaths, typically of a plastic film, are connected to one another and by which the tri-clamps are surrounded. In this case, however, the tri-clamps have to be opened and closed in the closed state of the secondary interfaces, which additionally makes the handling difficult and causes the time effort to further increase.

It is therefore an object of the present invention to propose a connection device for connecting a first line end to a second line end by which it is possible with simple and inexpensive means to connect a first line end and a second line end to one another and to release them from one another again in a simpler and faster manner in comparison with a tri-clamp.

BRIEF SUMMARY OF THE INVENTION

An embodiment of the present invention relates to a connection device for connecting a first line end to a second line end, wherein the first line end has a flange-like radial first extension having a first front face and a first back face; and the second line end has a flange-like radial second extension having a second front face and a second back face; and the connection device comprises a support ring that can be brought into contact with the first back face;

a blocking device that is releasably connectable to the support ring, wherein, in the installed state, the support ring or the blocking device projects axially over the first front face and forms a reception opening in which the second extension can be introduced and at least one blocking member that is movably supported in the radial direction in the support ring and/or in the blocking device; wherein the blocking member is adjustable by means of the blocking device between an open position in which the second front face can be brought into contact with the first front face and a closed position in which the blocking member applies an axially acting closing force to the second back face so that the second front face is pressed against the first front face.

Since the connection device in accordance with the proposal has a support ring and a blocking device connectable thereto, the connection device can be preinstalled to such an extent that only the second line end has to be introduced into the reception opening and the blocking member subsequently has to be radially moved. The two line ends can be connected to one another and released from one another again much more simply in this manner in comparison with the use of tri-clamps so that the connection can also easily be carried out by a single person. In addition, the time effort required for this drops considerably with respect to the use of tri-clamps. The connection device in accordance with the proposal is in particular suitable when the first line end and the second line end are designed the same.

In accordance with a further embodiment, the blocking device can surround the support ring in an annular manner. In this embodiment, the blocking device can be designed as annular and thus rotationally symmetrical, whereby the manufacturing costs can be kept low. In addition, the blocking device contacts the support ring over the full periphery, whereby a favorable force flow is achieved between the support ring and the blocking device.

In a further developed embodiment, the support ring can be formed by at least two ring segments that are releasably connectable to one another, with the ring segments terminating radially flush with the first extension or project radially outwardly over the first extension. In the event that two ring segments are provided, they can be designed as semi-ring segments and thus the same. The use of ring segments is in particular suitable when the two line ends to be connected are each fixedly connected to other components, for example containers or connectors. As a result, no free end is present over which the support ring can be pushed onto the line. In the two-part or multi-part embodiment of the support ring, it is, however, possible to arrange it around the respective first line. To this extent, the connection device can also be used in this embodiment when the first line is fixedly connected to other components.

In a further developed embodiment, the blocking device can be screwable onto the support ring. The screwing on is a comparatively simple procedure. In addition, the blocking device can be brought into the desired position axially relative to the support ring in which the blocking device also remains when the respective person releases the blocking device. The connection and disconnection of the two line ends are hereby simplified in a technically simple manner.

In a further embodiment, the blocking member can be displaceably supported in the blocking device in the radial direction and the second back face can have a second slanted surface inclined with respect to the second front face, with the blocking member applying the closing force to the second slanted surface. As initially mentioned, a number of line ends already have such slanted surfaces, in particular when they are used for chemical or biotechnological applications, so that they can be connected to one another by the initially mentioned tri-clamps that are also used with the connection device in accordance with the proposal. In this embodiment. the blocking member can be supported in a technically simple manner and the two line ends can nevertheless be pressed toward one another with a sufficiently large closing force to be able to sealingly connect them to one another.

A further developed embodiment can be characterized in that the blocking device comprises

- a first ring that is releasably connectable to the support ring, and
- a second ring that is connected to the first ring in a rotatably and axially fixed manner, with the second ring cooperating with the blocking member at a setting surface and the setting surface has a varying distance from or along the axis of rotation of the second ring.

The setting surface can either have a varying distance from the axis of rotation of the second ring or a varying distance along the axis of rotation of the second ring.

In the event that the setting surface has a varying distance from the axis of rotation of the second ring, the blocking member can be displaced more or less far radially inwardly and conversely by a rotational movement of the second ring. Since, however, the second ring is not axially moved on the rotation, the connection device in accordance with this embodiment can also be used when there is axially very little space around the connection device. It appears suitable in this embodiment to connect the firs ring to the support ring in a manner secured against rotation.

In the event that the setting surface has a varying distance along the axis of rotation of the second ring, the blocking member can be displaced more or less far radially inwardly and conversely by an axial movement of the second ring.

In accordance with a further embodiment, the blocking member can be preloaded toward the first setting surface by a first preload means. Since the blocking member is preloaded toward the setting surface, it is ensured that the setting surface always remains in contact with the blocking member. It is in particular hereby ensured that the blocking member is radially outwardly displaced to release the two line ends from one another.

In a further embodiment, it may be suitable that the blocking member is radially inwardly preloaded by a second preload means. In the event that the blocking member is preloaded both by the first preload means and by the second preload means, the preload force of the second preload means is selected as smaller than that of the first preload means. It is thus still ensured that the blocking member contacts the setting surface. A rotational position of the second ring can, however, also be provided in which the blocking member does not contact the setting surface and can therefore be moved by a certain degree radially outwardly against the preload force of the second preload means. The second line end can hereby be prefixed so that the respective person can take their hands from the second line end. The blocking member is only subsequently brought into contact with the setting surface and radially inwardly displaced by rotating the second ring. The connection and the release of the line ends is hereby further simplified.

A preferred embodiment provides that

- the blocking member is supported displaceably in the radial direction in the support ring; and
- the second back face has a second slanted surface inclined with respect to the second front face, with the blocking member applying the closing force to the second slanted surface, wherein
- the blocking device comprises a setting ring that is connected to the support ring in a rotatably and axially fixed manner, with the setting ring cooperating with the blocking member at a setting surface and the setting surface having a varying distance from or along the axis of rotation of the setting ring.

In this embodiment, the blocking member can be designed as a blocking slot nut and can be supported radially displaceably in the support ring in a correspondingly complementarily shaped groove. The support ring is designed in one part to keep the number of components of the closure device small. However, it may be advantageous to design the support ring in multiple parts, for example, for technical production reasons and technical installation reasons. The blocking member is radially displaced due to the varying distance of the setting surface from the axis of rotation as a result of a rotation of the setting ring about its axis of rotation that coincides with the already mentioned longitudinal axis. Due to the inclination of the second slanted surface, the second line end is pressed toward the first line end on a radially inwardly directed movement of the blocking member, whereby the first line end is connected to the second line end. The setting ring is rotated in the opposite direction to release the line ends from one another. The blocking member can admittedly be radially outwardly preloaded by a preload means so that the blocking member is moved radially outwardly due to the hen increasing distance of the setting surface from the axis of rotation. To save the preload means, however, the setting surface can engage behind a complementarily shaped section of the blocking member in the manner of a wedge and can thus exert a radially outwardly directed force on the blocking member.

In a further developed embodiment, the second ring can be manually rotatable by means of a handle piece. The handle piece can, for example, be designed as a hand wheel or as a lever so that the respective person can rotate the second ring in a pleasing manner without the person having to apply an excessively great force so that the connection device can provide a sufficiently large closing force.

In a further developed embodiment, the second ring can be rotatable by means of a drive unit. A hydraulic cylinder or a pneumatic cylinder or an electric drive can be used as the drive unit, for example. The connection and the release can herewith be automated and consequently simplified. It is additionally possible to document he connection and release in a largely automated manner. The drive unit can furthermore be controlled such that a specific tightening torque and consequently a corresponding closing force can be provided. It can thus be ensured that the two line ends are not pressed to one another either too much or too little.

An embodiment of the invention relates to a connection device for connecting a first line end to a second pipe end, wherein

- the first line end has a flange-like radial first extension having a first front face and a first back face; and
- the second line end has a plurality of flange-like radial second extensions each having a second front face and a second back face, with the second extensions being separated from one another by interruption sections and the connection device
- comprising a connection ring having a radially peripheral first closure surface and a plurality of second closure surfaces that are separated from one another by passage sections; wherein
- the first closure surface can be brought into contact with the first back face; and
- the second closure surfaces can be brought into contact with the second back faces so that the second extensions are guided through the passage sections by an axial movement and are subsequently rotated.

The closure ring is designed at the first closure surface such that it can be brough into contact with the first back face over a large area while the closure ring has a plurality of second closure surfaces to establish a bayonet-like connection with the second extensions of the second line ends. In this embodiment of the connection device, the first extension can be designed according to the standard in the manner of a contact flange as is required on the use of commercial tri-clamps while the second line end is designed in bayonet form. Only an axial movement, followed by a rotational movement, is required to connect and release the two line ends so that the connection and release can take place in a very simple and fast manner.

Provision can be made in a further embodiment that the connection ring is formed by two or more ring segments. In the event that two ring segments are provided, they can be designed as semi-ring segments and thus the same. Even if more than two ring segments are provided, they can be designed the same. The use of ring segments is in particular suitable when the two line ends to be connected are each fixedly connected to other components, for example containers or connectors. As a result, no free end is present via which the connection ring could be pushed onto the line connected to the first line end. In the two-part or multi-part embodiment of the connection ring, it is, however, possible to arrange it around the respective first line.

A further developed embodiment can specify that the ring segments are connectable to one another by means of a cable tie. Cable ties represent a mass produced article that can be obtained inexpensively. In addition, cable ties are very simple to operate and are reliable in their function.

In accordance with a further developed embodiment, the second closure surfaces and/or the second back faces can be inclined in the peripheral direction. Due to the rotation of the second line end its rotational movement is also converted into an axial movement due to the inclination of the second closure surfaces and/or of the second back faces so that the second line end is moved toward the first line end, whereby a certain contact pressure is established between the two line ends and the latter can be sealingly connected to one another.

Provision can be made in a further embodiment that the connection device comprises a secondary interface that surrounds the connection ring with a radial spacing. Tubular sheaths by which the two line ends can be surrounded can be connected to one another by a secondary interface The likelihood that in particular toxic substances enter into the environment can hereby be considerably reduced.

An embodiment of the present invention relates to a connection device for connecting a first line end to a second line end, wherein

- the first line end has a first connection section; and
- the second line end has a second connection section; and the connection device comprises:
- a first connection member having
  - a first counter-connection section, with the first connection member being connectable or connected to the first line end using the first connection section and the first counter-connection section; and
  - a first locking section;
- a second connection member having
  - a section counter-connection section, with the second connection member being connectable or connected to the second line end using the second connection section and the second counter-connection section; and
  - a second locking section;
- a locking member that
  - defines a longitudinal axis and having
  - a first counter-locking section by which the locking member is connectable using the first locking section to the first connection member by means of a translatory movement along the longitudinal axis and/or a rotational movement about the longitudinal axis.
  - a second counter-locking section by which the locking member is connectable using the second locking section to the second connection member by means of a translatory movement along the longitudinal axis and/or a rotational movement about the longitudinal axis, wherein
- the connection between
  - the locking member and the first connection member and/or between the locking member and the second connection member is releasable.

The first connection section of the first line end and/or the second connection section of the second line end can be designed as desired. The first connection member and the second connection member have a first counter-connection section or a second counter-connection section that are complementary to the first connection section or to the second counter-connection section. At the oppositely disposed end, the first connection member and the second connection member are provided with a first locking section or a second locking section respectively. The locking member has a first counter-locking section cooperating with the first locking section on the connection and in the connected state and a second counter-locking section cooperating with the second locking section. The first locking section and the first counter-locking section as well as the second locking section and the second counter-locking section are designed such that a connection can be established between the locking member and the first connection member and the second connection member by means of a translatory relative movement along the longitudinal axis and/or a rotational relative movement about the longitudinal axis. The rotational movement relates to the locking member and to the first connection member and/or the second connection member. The connection between the first connection member and the locking member can, for example, be established solely by means of a translatory relative movement between the connection member and the locking member. Further movements are not necessary in this case. In particular no further connection means have to be opened or closed.

It is not necessary that both the connection between the locking member and the first connection member and the connection between the locking member and the second connection member are releasable. It is sufficient if one of the two connections is releasable.

The connection between the first line end and the first connection member and between the second line end and the second connection member can be established once and remain permanently. The connection and disconnection take place exclusively using the locking member in this case. Two line ends can be connected to one another in a simple manner due to this design. It must be emphasized at this point that line ends can also be connected to one another whose connection sections do not match one another or are not complementary to one another using the connection device in accordance with the present embodiment.

A further embodiment is characterized in that the first counter-locking section has hooks movable radially to the longitudinal axis; and the first locking section has first closure surfaces, or vice versa, wherein the hooks are first moved outwardly radially to the longitudinal axis in the locking section and subsequently engage behind the first closure surfaces due to a translatory relative movement along the longitudinal axis.

The locking member and the first connection member are first aligned approximately coaxially to one another and subsequently moved toward one another along the longitudinal axis to form a connection. Further steps are not necessary. In the connected state, the hooks engage behind the first closure surfaces so that a shape matched connection is provided. This connection can be unreleasable in dependence on the design of the closure surfaces, for example approximately in ring shape peripherally without interruption and of the hooks. The closure surfaces can, however, also be interrupted. The shape matched connection can consequently be cancelled in a certain rotational position.

The second locking section and the second counter-locking section can likewise be correspondingly formed.

In accordance with a further developed embodiment, the locking member has bulges outwardly projecting radially to the longitudinal axis, with the hooks being surrounded by the bulges. In this respect, the hooks are arranged within the space surrounded by the bulges. The hooks can be protected from external influences. The bulges can furthermore define a radial maximum deflection of the hooks to avoid an irreversibly plastic deformation. In the event that the locking member has to be rotated to form or release the connection between the locking member and the first connection member and/or the second connection member, the bulges facilitate the rotation since the user has an engagement surface.

A further developed embodiment provides that the second counter-locking section has recesses with an introduction region and a locking region; and the second locking section has second locking prolongations, or vice versa, wherein the locking prolongations can first be introduced into the introduction region due to a translatory movement along the longitudinal axis and subsequently into the locking region due to a rotational movement about the longitudinal axis.

In this embodiment, the connection between the locking member and the second connection member is established in the manner of a bayonet closure that is typically releasable. If the connection between the locking member and the first connection member can be established by the already mentioned hooks, this connection can be unreleasable, which is constructively simpler in comparison with a releasable connection. Since two different movements have to be performed to form the connection between the first connection member and the locking member as well as between the second connection member and the locking member, a clear sequence is specified and the likelihood of operating errors is reduced.

In a further aspect, the first connection member and/or the second connection member is/are of funnel shape. Diameter differences between the line ends can be compensated by the funnel-like design. In addition, the emptying of, for example, a container that forms the first or second Ine end is simpler as a result of the funnel-like design.

In accordance with a further developed embodiment the first connection section and the first counter-connection section are designed as tri-clamp stubs; and/or the second connection section and the second counter-connection section are designed as tri-clamp stubs.

In this respect, the tri-clamp stubs are in particular designed as standard tri-clamp stubs. Standard tri-clamp stubs are standardized, for example, in ISO 2852 1993-06 (issued in June 1993 and canceled in the meantime)or in DIN 31676 in the version valid on the priority data. The standard tri-clamp stubs are in particular frequently used in biotechnological and pharmaceutical applications. In this embodiment, the connection device can be used for a large number of line ends.

In accordance with a further developed embodiment a first adapter is connectable to the first counter-connection section to form the connection with the first connection section; and/or a second adapter is connectable to the second counter-connection section to form the connection with the second connection section.

The adapters can be used in the simplest case as extensions of the connection device if this should be necessary. The adapter can, however, also be used when the line ends to be connected have different diameters or at least one of the line ends has a special connection section not formed as complementary to the first connection section or the second connection section. It is suitable to use an adapter, for example, when the second line end is formed by a container having a screw closure.

A further developed embodiment provides that the first connection member has a first reception section for receiving a first tubular sheath; and/or the second connection member has a second reception section for receiving a second tubular sheath.

The tubular sheaths can be used to form a secondary interface, for which purpose they are connected to one another. The two line ends are surrounded by the secondary interface. The likelihood that in particular toxic substances enter into the environment can hereby be considerably reduced.

An implementation of the present invention relates to the use of the connection device in accordance with one of the previously described embodiments and designs in the preparation and transport of biotechnological and pharmaceutical products. The advantages and the technical effects that have been described for the connection device can be achieved in the same way by the use. It appears suitable to use the connection device to connect two line ends of the same design. In particular when the connection device is operated with a secondary interface, the connection device is also suitable for the connection of line ends through which toxic substances are conducted. In many cases, they are here particulate substances, with the substances also being able to be guided through the line ends in a liquid or gaseous state.

BRIEF DESCRIPTION OF THE SEVERAL VIEWS OF THE DRAWING

The foregoing summary, as well as the following detailed description of the preferred invention, will be better understood when read in conjunction with the appended drawings. For the purpose of illustrating the preferred invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1A:
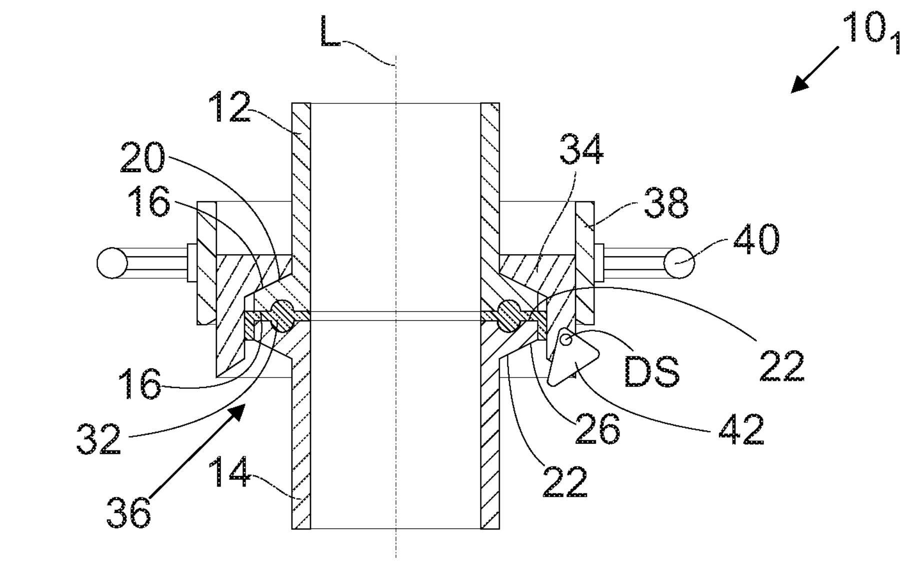
FIG. 1A is a cross-sectional view of a first embodiment of a connection device in accordance with the preferred invention for connecting a first line end to a second line end, with the line ends being prepositioned.

In FIG. 1A a first embodiment of a connection device 101 in accordance with the invention for connecting a first line end 12 to a second line end 14 is shown with reference to a basic sectional representation. The first line end 12 can, for example, be the end of a pipe or a tube. The same applies accordingly to the second line end 14. The pipes or the tubes can be connected to a container or to a connector, for example to a supply connector (not shown).

The first line end 12 has a flange-like radial first extension 16 having a first front face 18 and a first back face 20. The second line end 14 has a corresponding design and consequently comprises a flange-like radial second extension 22 having a second front face 24 and a second back face 26. It can be recognized that the first back face 20 and the second back face 26 are inclined with respect to the first front face 18 and a second front face 24 so that the first line end 12 comprises a first slanted surface 28 and the second line end 14 comprises a second slanted surface 30. It can additionally be recognized that a sealing element 32 is in this case fastened to the second line end 14, with a fastening likewise being possible to the first line end 12. The first line end 12 and the second line end 14 are designed such that they can be connected to one another by a commercial tri-clamp.

The connection device 101 has a support ring 34 that can be brought into contact with the first back face 20. In this respect, the support ring 34 can be formed in the manner of a clamping set so that the support ring 34 can be fixed to the first line end 12 axially and secure against rotation. As mentioned, the first back face 20 is designed as the first slanted surface 28 so that the support ring 34 likewise has a contact surface correspondingly aligned with the first slanted surface 28. It can additionally be recognized from FIG. 1A that the support ring 34 projects radially outwardly over the first extension 16 and the second extension 22. The support ring 34 additionally projects over the first front face 18 when the support ring 34 has been brought into contact with the first back face 20. Due to this design, the support ring 34 forms a reception opening 36 into which the second extension 22 of the second line end 14 can be introduced, as is shown in FIG. 1A. The first line end 12 and the second end 14 here define a longitudinal axis L with respect to which the support ring 34 is concentrically arranged.

The connection device 101 furthermore comprises a blocking device 38 that is designed as annular in the first embodiment and has an internal thread. The blocking device 38 can consequently be screwed onto the support ring 34 and positioned coaxially to the longitudinal axis L, with the support ring 34 having a correspondingly formed external thread, with the internal thread and he external thread not being shown in any more detail in FIG. 1A. The blocking device 38 has a handle piece 40, that is formed in the manner of a hand wheel 58, for its rotation. A user can consequently rotate the blocking device 38 in a simple manner and thus screw it onto the support ring 34.

A blocking member 42 is furthermore provided that is fastened to the support ring 34 in the first embodiment. The blocking member 42 is fastened to the support ring 34 such that it is rotatable about an axis of rotation DS extending perpendicular to the longitudinal axis L, with the blocking member 42 being fastened to the support ring 34 in the region of the reception opening 36 and is thus arranged in front of the first front face 18 viewed form the first back face 20. The axis of rotation DS extends eccentrically through the blocking member 42 that has an approximately triangular cross-section in the first embodiment with respect to the illustration plane defined by FIG. 1A. The blocking member 42 is supported such hat it can cooperate with the blocking device 38 depending on the latter's position. In FIG. 1A, the blocking device 38 is in an open position in which it does not cooperate with the blocking member 42. The blocking member 42 can consequently be rotated largely unrestrictedly about its axis of rotation DS. As a result, the second line end 14 can be introduced into the reception opening 36 without the blocking member 42 interfering here.

The second line end 14 is here introduced so far into the reception opening 36 that the first front face 18 comes into contact with the sealing element 12. The support ring positions the second line end 14 to the extent that it is aligned axially flush with the longitudinal axis L of the first line end 12. The blocking device 38 is subsequently rotated about the longitudinal axis L, whereby it performs an axial movement along the longitudinal axis L that is downwardly directed with respect to FIG. 1A. In this respect, the blocking device 38 comes into contact with the blocking member 42 from a certain position onward and in so doing rotates the blocking member 42 clockwise about is axis of rotation DS with respect to the representation in turn selected in FIG. 1A. Some of the blocking member comes into contact with the second back face 26 due to its eccentric support and applies a closing force to the second back face 26 that is directed at least partially along the longitudinal axis L and toward the first front face 18. As a result, the second line end 14 is pressed toward the first front face 18 of the first line end 12, whereby the sealing element 32 is compressed. The blocking member 42 is now in a closed position. The first line end 12 and the second line end 14 ae now sealingly connected to one another as is shown in FIG. 18 so that fluids, particulate solids, or the like can be conveyed from the first line end 12 into the second line end 14 and vice versa.

To release the second line end 14 from the first line end 12, the blocking device 38 is brought into a position such that it no longer cooperates with the blocking member 43, for example in the position shown in FIG. 1A.

Figure 1B:
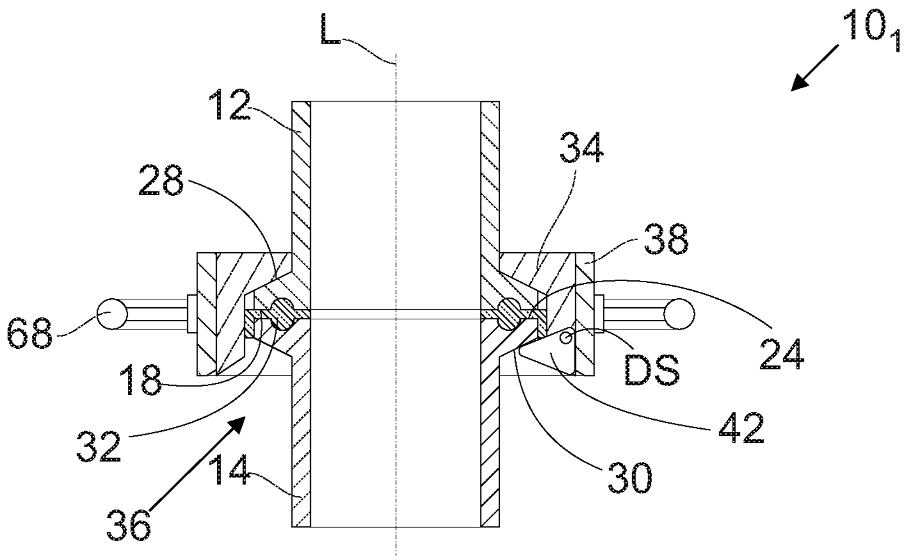
FIG. 1B is a cross-sectional view of the first embodiment of the connection device shown in FIG. 1A in which the line ends are connected to one another.
Figure 2A:
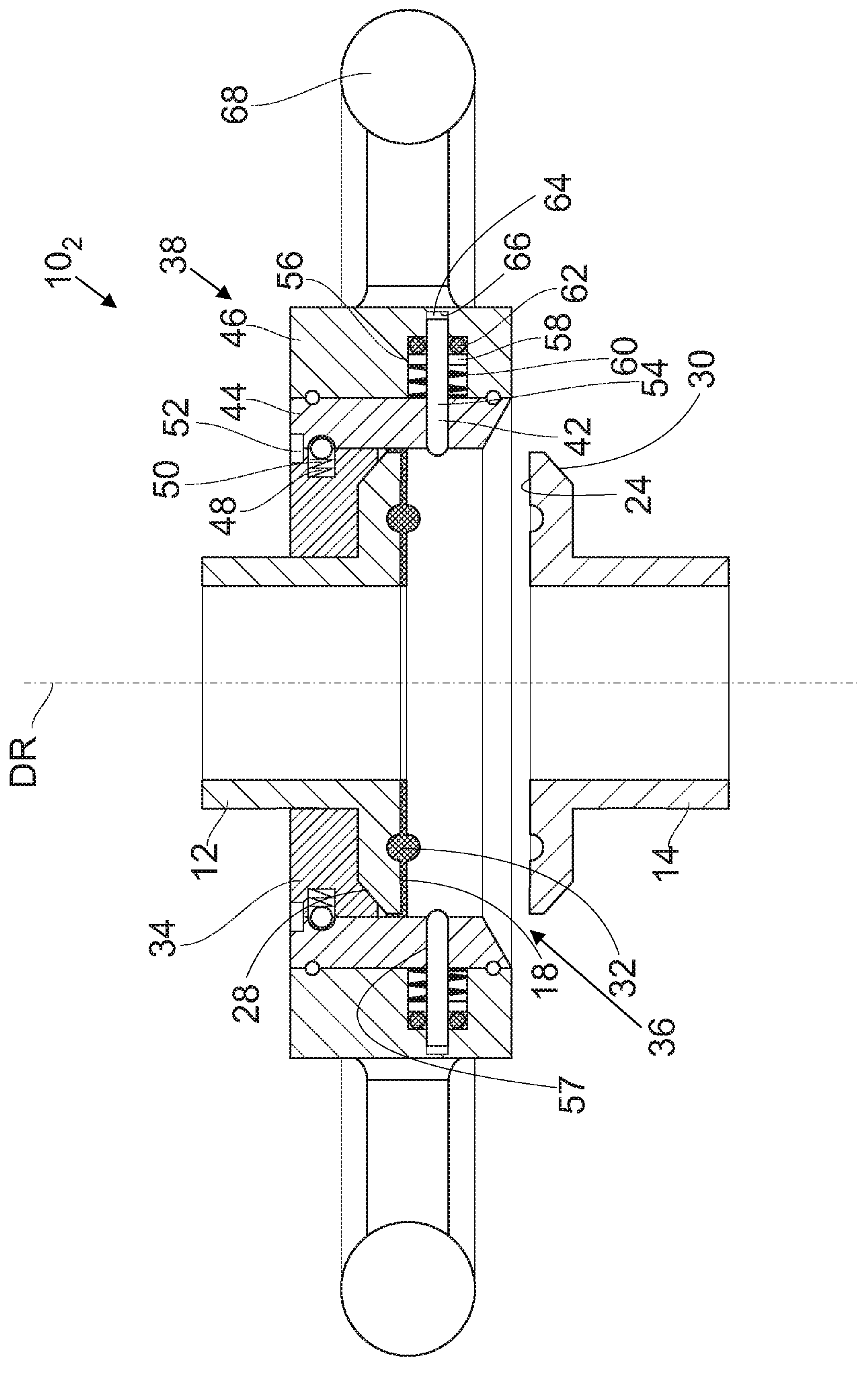
FIG. 2A is a cross-sectional view of a second embodiment of the connection device in accordance with the preferred invention for connecting a first line end to a second line end.
Figure 2B:
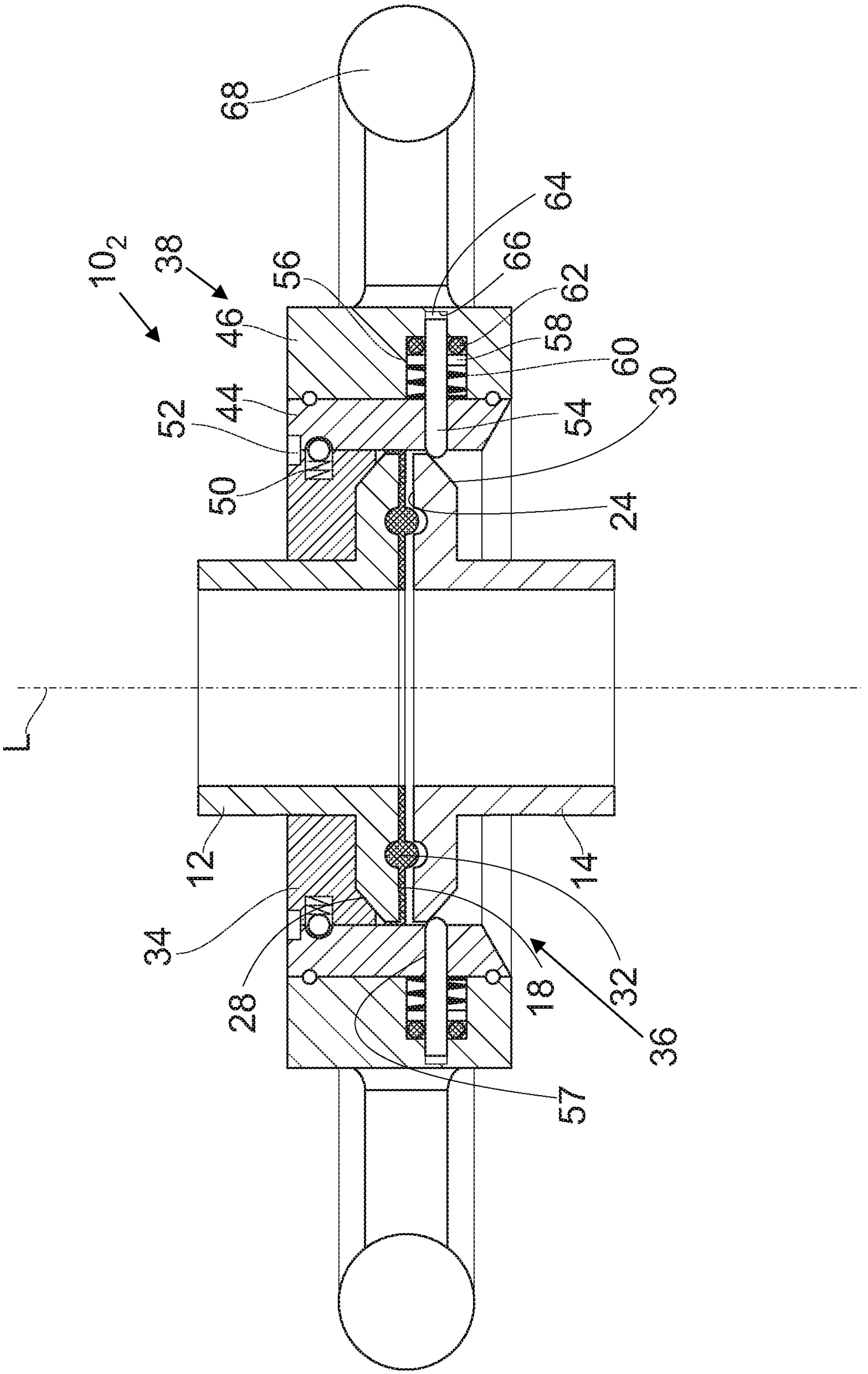
FIG. 2B is a cross-sectional view of the second embodiment of the connection device shown in FIG. 2A in which the line ends are prepositioned.
Figure 2C:
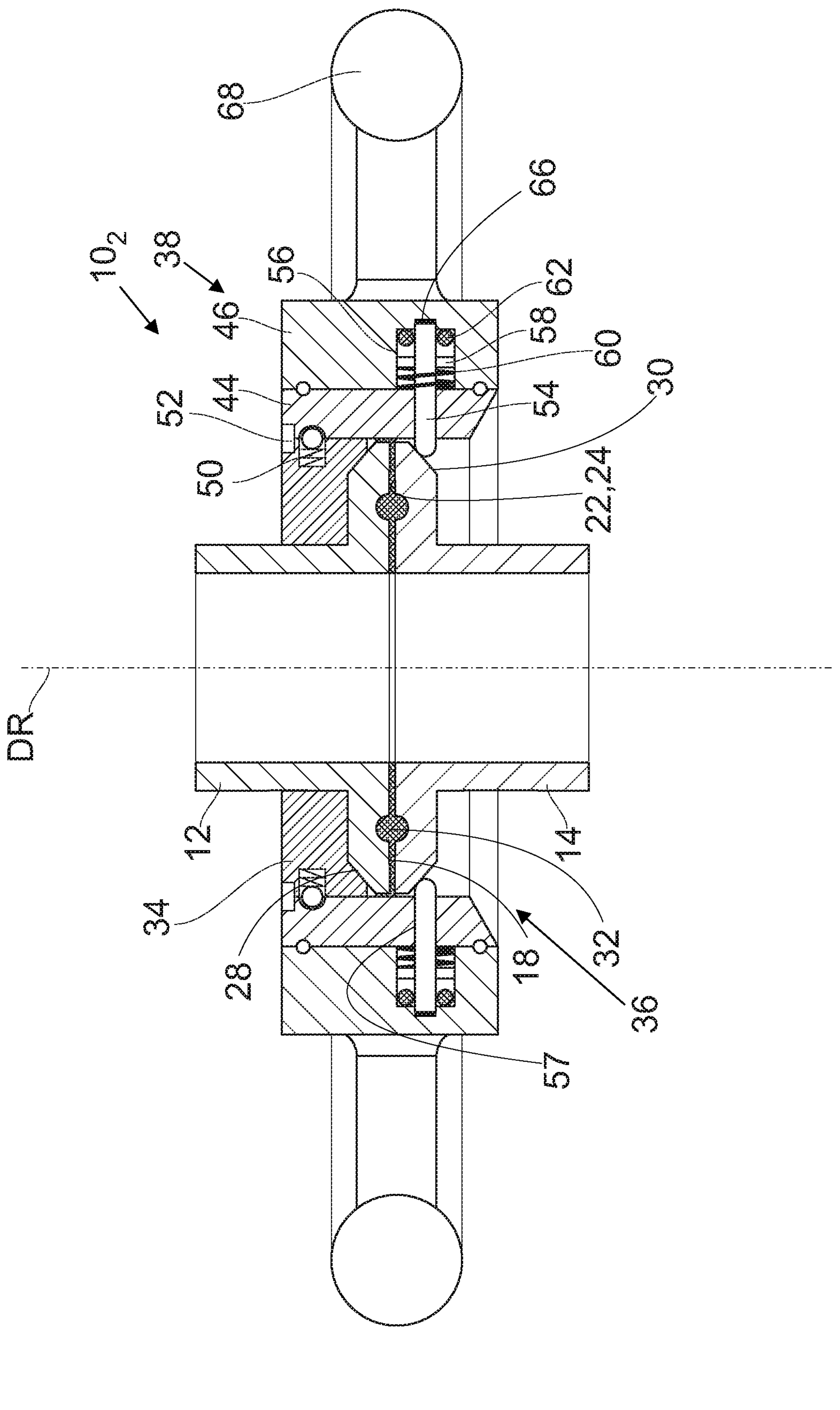
FIG. 2C is a cross-sectional view of the second embodiment of the connection device shown in FIG. 2A in which the line ends are connected to one another, in each case using basic sectional representations.

A second embodiment of the connection device 102 in accordance with the invention is shown likewise with reference to basic sectional representations in FIGS. 2A to 2C. In this respect, the first line end 12 and the second line end 14 are substantially designed exactly as described for the embodiment shown in FIGS. 1A and 1B so that reference can be made to the description with respect to it. The connection device 102 in this case also comprises the already mentioned support ring 34 that can be brought into contact with the first back face 20 of the first line end 12, as also shown in FIG. 2A. However, the support ring 34 only projects over the first extension 16 to a very small degree in the radial direction. In addition, the blocking device 38 comprises a first ring 44 and a second ring 46 in this case. The second ring 46 is rotatably fastened to and about the first ring 44 about an axis of rotation DR without the second ring 46 being able to be axially moved in so doing. The axis of rotation DR coincides with the longitudinal axis L of the first line end. The first ring 44 is releasably connectable to the support ring 34. A latch connection 48 having correspondingly formed latch means 50 is provided for this purpose so that the first ring 44 only has to be pushed onto the support ring 34 until the latch means 50 establish a shape matched connection between the first ring 44 and the support ring 34. A security against rotation 52 is furthermore provided by which it is ensured that the first ring 44 cannot rotate about the support ring 34. The first ring 44 and the second ring 46 are arranged concentrically with respect to the longitudinal axis L.

The already mentioned blocking member 42 is supported in the blocking device 38 in this case and is formed as a blocking pin 54. The blocking pin 54 is axially displaceably supported in a blind hole bore 56 of the second ring 46 and passes through a bore 57 of the first ring 44. The blocking pin 54 comprises a collar 58 at which a first preload means 60 and a second preload means 62 are supported. The first preload means 60 is furthermore supported at the first ring 44 while the second preload means 62 is supported at the base of the blind hole bore 56. While the first preload means 60 is formed as a spring, the second preload means 62 is implemented as a resilient O ring.

The blocking pin 54 furthermore projects into a groove 64 that extends to a certain degree in the peripheral direction of the second ring 46 and forms a setting surface 66 at its groove base. The distance of the setting surface 66 from the longitudinal axis L varies in the peripheral direction of the groove 64.

The first preload means 60 is formed such that it preloads the blocking pin 54 toward the setting surface 66 while the second preload means 62 preloads the blocking pin 54 radially inwardly.

The connection device $10_2$ is in a starting position in FIG. 2A. In this starting position, the second line end 14 is not yet introduced into the reception opening 36 that is formed by the first ring 44 in this case. The blocking pin 54 does not yet contact the setting surface 66 in this case and can therefore still be radially outwardly moved by a certain amount. In FIG. 2B, the second line end 14 is introduced into the reception opening 36, with the blocking pin 54 contacting the second slanted surface 30. On the introduction of the second line end 14 into the reception opening 36, the second extension 22 comes into contact with the blocking pin 54 and moves it so far radially outwardly that the blocking pin 54 does not block the axial movement of the second line end 14. In this respect, the second preload means 62 are compressed, whereby a radially inwardly directed return force is generated. As soon as the second line end 14 has been moved so far toward the first line end 12 that the diameter of the second extension 22 decreases in the region of the second slanted surface 30, the blocking pin 54 is again radially inwardly displaced due to the return force of the second preload means, with the blocking pin 54 being able to come into contact with the second slanted surface 30. In the position shown in FIG. 2B, the second line end 14 is as a result held in the position shown there by the blocking pin 54; however, the second line end 14 does not yet contact the sealing element 32 over the full area so that there is not yet any sealing connection between the first line end 12 and the second line end 14. However, the respective person can take his hand off the second line end 14 and grip the handle piece 40 to rotate the second ring 46. As mentioned, the distance of the setting surface 66 from the longitudinal axis L varies in the peripheral direction of the groove 64. The second ring 46 is now rotated so that the distance of the setting surface 66 from the longitudinal axis L decreases in the region of the blocking pin 54. The blocking pin 54 consequently comes into contact with the setting surface 66 from a certain rotational position of the second ring 46. The further the second ring 46 is rotated, the further the blocking pin 54 is moved radially inwardly and is pressed against the second slanted surface 30. In this respect. the blocking pin 4 partially transmits a force directed along the longitudinal axis L onto the second slanted surface 30 as a result of which the second line end 14 is displaced toward the first front face 18 of the first line end 12. In this respect, the second front face 24 comes into sealing contact with the sealing element 32 so that the first line end 12 and the second line end 14 are sealingly connected to one another. The blocking pin 54 is now in the closed position(see FIG. 2C).

Due to the radially inwardly directed movement of the blocking pin 54, the first preload means 60 are compressed that as a result exert a radially outwardly directed return force. Due to the contact of the blocking pin 54 with the setting surface 66, the blocking pin 54 remains in the position shown in FIG. 2C so that the second line end 14 can no longer be axially displaced relative to the first line end 12.

The second ring 46 is rotated in the opposite direction to again release the second line end 14 from the first line end 12. It is ensured due to the return force generated by the first preload means 60 that the blocking pin 54 is also pressed against the setting surface 66 on the rotation of the second ring 46. Since the distance of the setting surface 66 from the longitudinal axis L increases in this case, the blocking pin 54 moves radially outwardly. As a result, the second line end 14 is let go and can be released from the first line end 12.

Figure 3A:
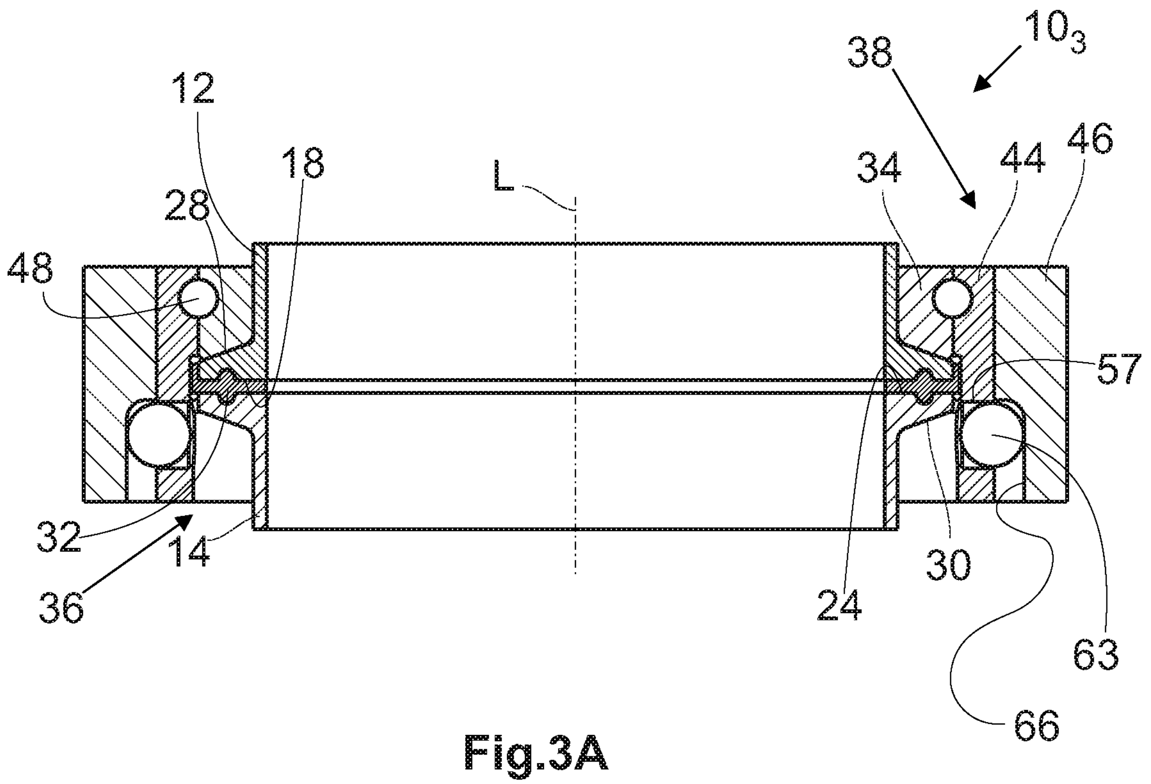
FIG. 3A is a cross-sectional view of a third embodiment of the connection device in accordance with the preferred invention for connecting a first line end to a second line end in which the line ends are prepositioned.
Figure 3B:
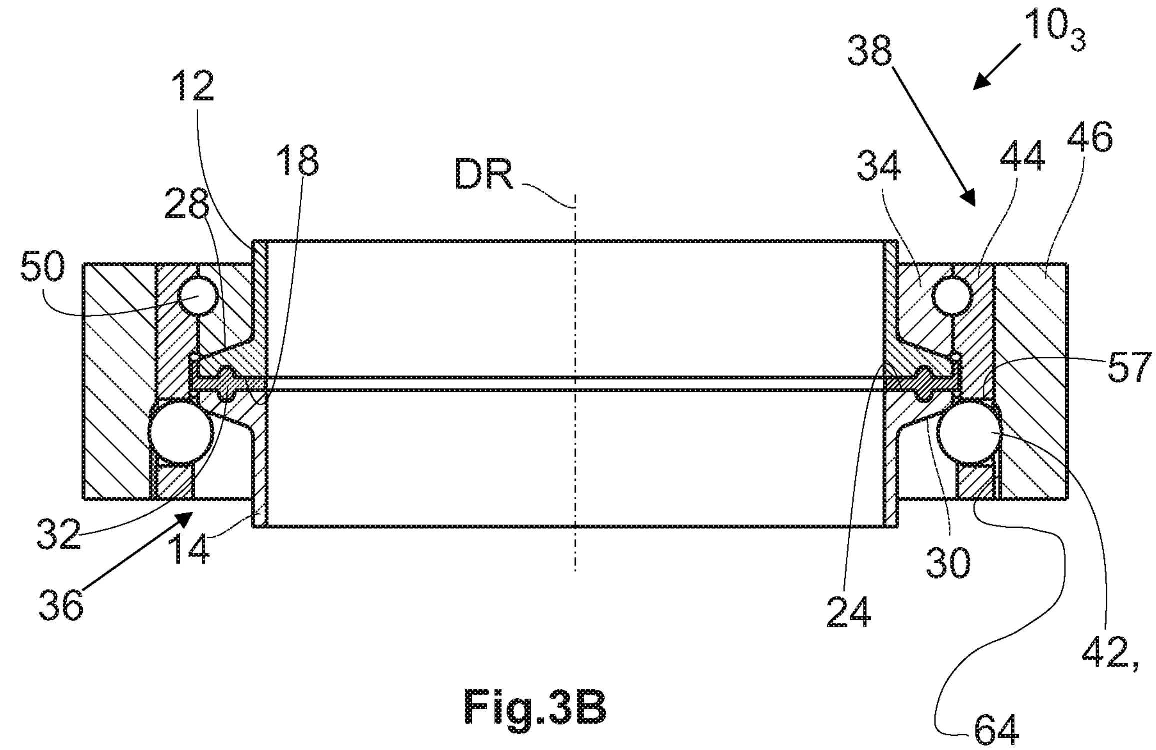
FIG. 3B is a cross-sectional view of the third embodiment shown in FIG. 3A in which the line ends are connected to one another.

A third embodiment of the connection device 103 is shown with reference to a sectional representation in FIGS. 3A and 3B, with the second line end 14 being prepositioned in FIG. 3A while the first line end 12 and the second line end 14 are connected to one another in FIG. 3B. The connection device 103 in accordance with the third embodiment is designed similarly to the connection device 102 in accordance with the second embodiment so that only the essential differences will be looked at in the following. The blocking member 42 is designed as a locking ball 63 that, like the blocking pin 54 of the second embodiment of the connection device 102 is supported in a bore 57 of the first ring 44. The second ring 46 also has the already mentioned groove 64 in this embodiment at whose groove base the setting surface 66 is formed. The distance of the setting surface 66 from the axis of rotation DR of the second ring 46 varies in the peripheral direction of the groove 64. The blocking ball 63 contact the setting surface 66. If the second ring 46 is rotated, the blocking ball 63 is moved radially inwardly and is pressed against the second slanted surface 30. In this respect. the blocking ball 63 partially transmits a force directed along the longitudinal axis L onto the second slanted surface 30 as a result of which the second line end 14 is displaced toward the first front face 18 of the first line end 12. In this respect, the second front face 24 comes into sealing contact with the sealing element 32 so that the first line end 12 and the second line end 14 are sealingly connected to one another. The blocking ball 63 is now in the closed position(see FIG. 3B).

The second ring 46 is again rotated back into the position shown in FIG. 3A to release the first line end 12 from the second line end 14. If the second line end 14 is moved away from the first line end 12, the blocking ball 63 is pressed radially outwardly and releases the path for the second line end 14 so that the second line end 14 can be removed from the reception opening 36.

Figure 4A:
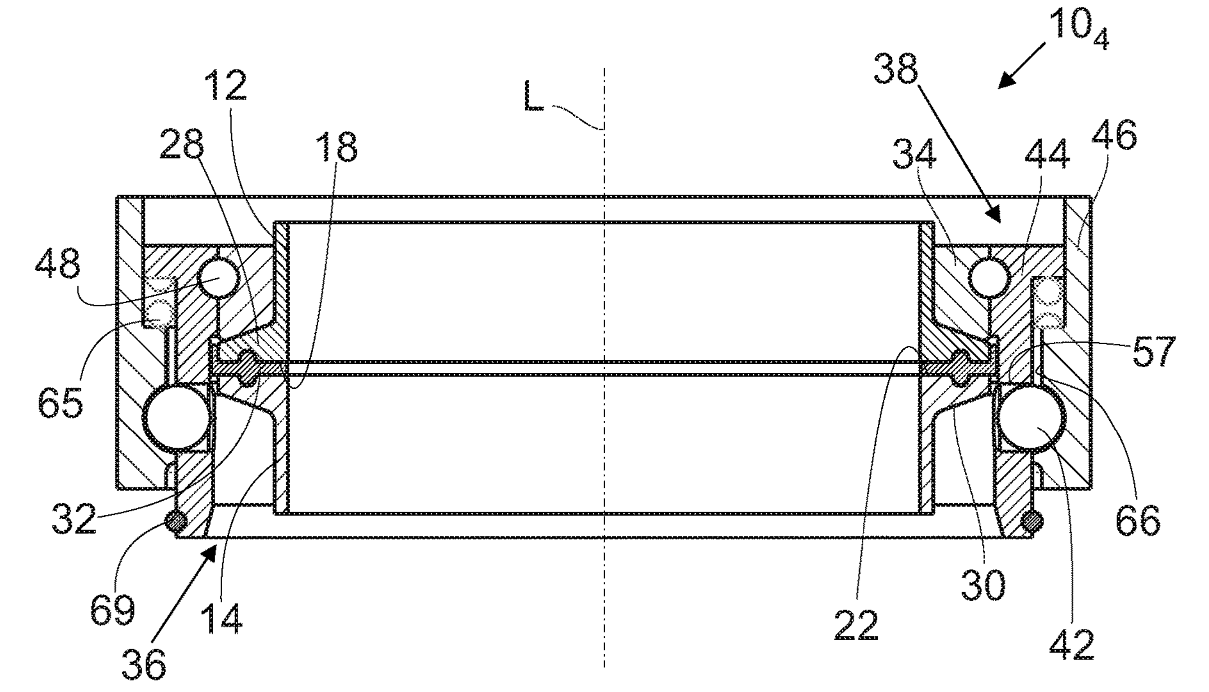
FIG. 4A is a cross-sectional view of a fourth embodiment of the connection device in accordance with the preferred invention for connecting a first line end to a second line end in which the line ends are prepositioned.
Figure 4B:
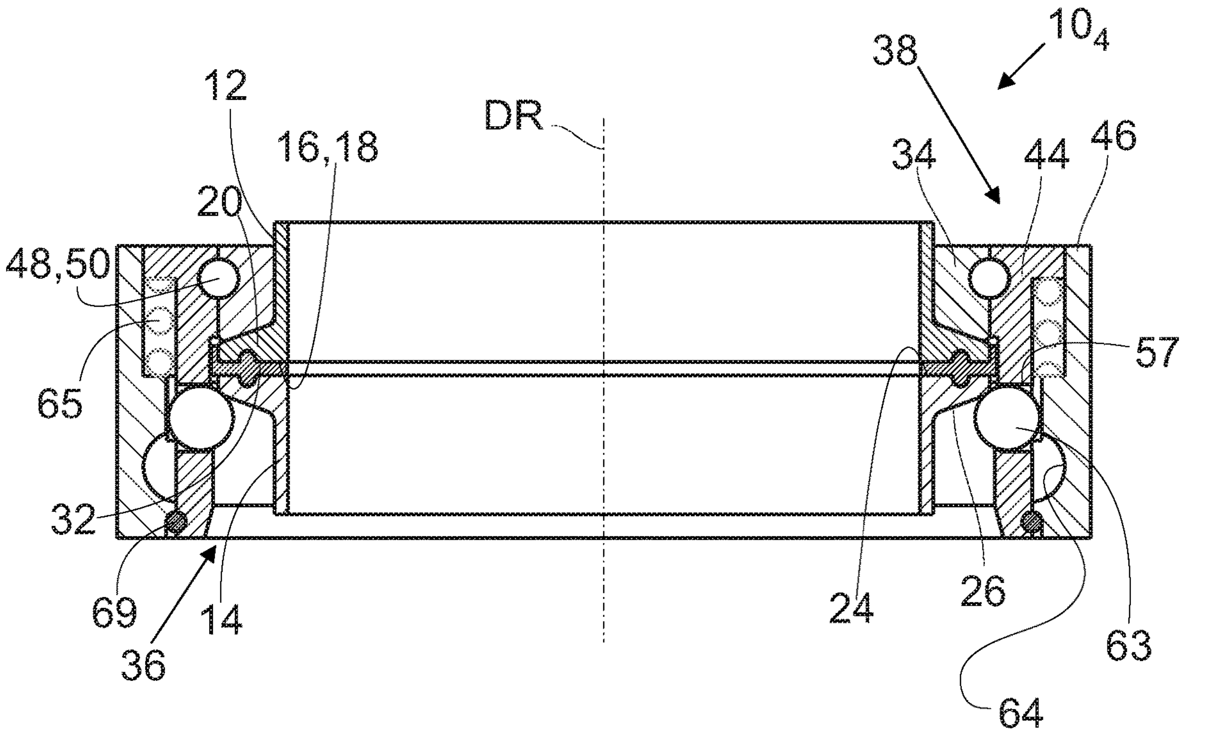
FIG. 4B is a cross-sectional view of the fourth embodiment shown in FIG. 3A in which the line ends are connected to one another.

A fourth embodiment of the connection device 104 is shown with reference to a sectional representation in FIGS. 4A and 4B, with the second line 14 being prepositioned in FIG. 4A while the first line end 12 and the second line end 14 are connected to one another in FIG. 4B. The blocking member 42 is also designed as a blocking ball 63 that is supported in a bore 57 of the first ring 44 in this embodiment. The second ring 46 in this embodiment is axially movable with respect to the first ring 44 and is preloaded by a spring 65 into the position shown in FIG. 4B. A stop element 69 is provided at the first ring 44 to define this position by which the axial movability of the second ring 46 is bounded. The second ring 46 is also equipped with the groove 64 in this embodiment; however, the spacing of the setting surface 66 from the axis of rotation DR in the peripheral direction does not change; however, in the axial direction. In this case, the second ring 46 does not necessarily have to be rotatably fastened to the first ring 44. To this extent, the term "axis of rotation" DR is to be understood geometrically and not functionally. If the second ring 46 is in the position shown in FIG. 4B, the blocking ball 63 is pressed against the second slanted surface 30 so that the second line end 14 is pressed against the first line end 12. The blocking ball 63 cannot escape radially outwardly so that the second line end 14 can no longer be axially displaced relative to the first line end 13.

To release the second line end 14 from the first line end 12 again, the second ring 46 is displaced against the preload force of the spring 65 into the position shown in FIG. 4A in which the radial distance of the setting surface 66 from the axis of rotation DR increases in the region of the blocking ball 63 and is so large that the blocking ball 63 can escape so far radially outwardly that the second line end 14 is let go and can be released from the line end 12.

Figure 4C:
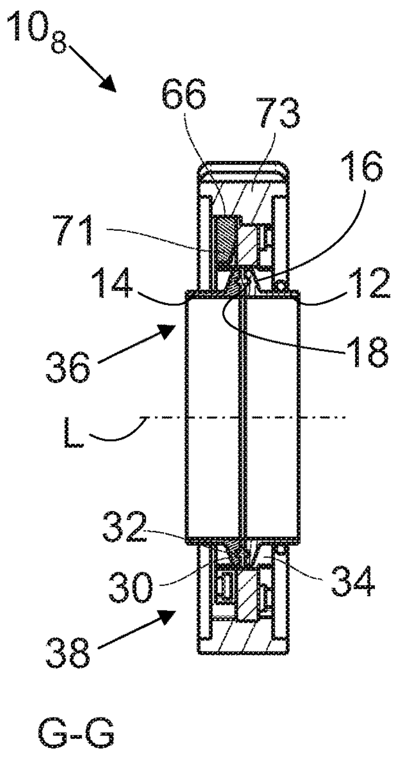
FIG. 4C is a cross-sectional representation of an eighth embodiment along a sectional plane defined in FIG. 4D in which the line ends are prepositioned.
Figure 4D:
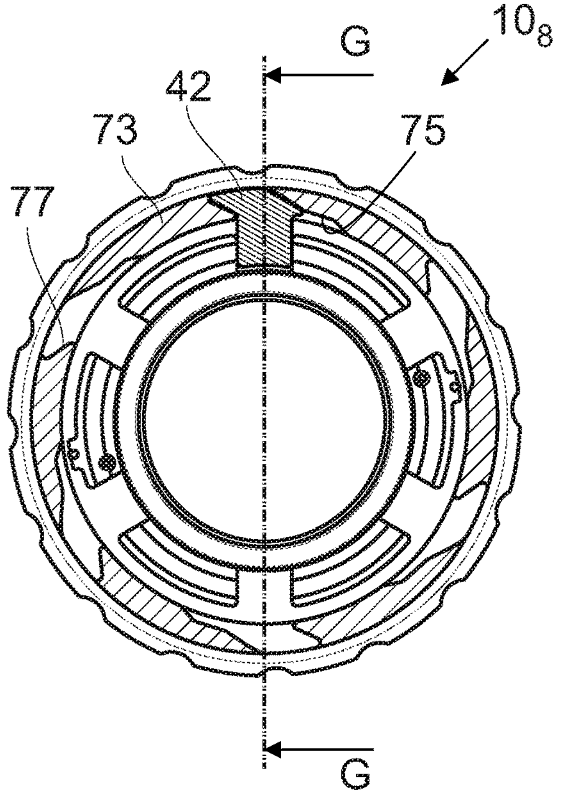
FIG. 4D is a cross-sectional representation of an eighth embodiment of the connection device in which the line ends are prepositioned.
Figure 4E:
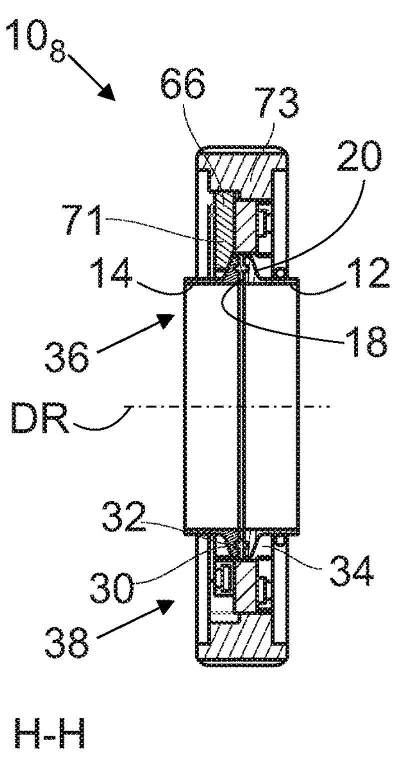
FIG. 4E is a cross-sectional representation of an eighth embodiment along a sectional plane defined in FIG. 4F in which the line ends are connected to one another.
Figure 4F:
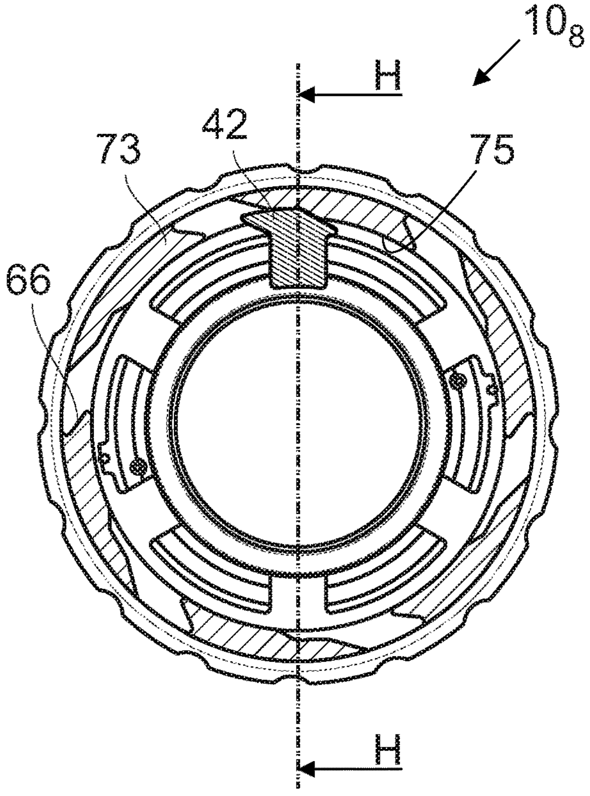
FIG. 4F is a cross-sectional representation of an eighth embodiment of the connection device in which the line ends are connected to one another.

An eighth embodiment of the connection device $\mathbf{10_8}$ is shown with reference to different representations in FIGS. 4C to 4F. FIG. 4C shows the connection device $\mathbf{10_8}$ along the sectional plane G-G defined in FIG. 4B while FIG. 4E shows the connection device $\mathbf{10_8}$ along the sectional plane H-H defined in FIG. 4F. The second line end 14 is prepositioned in FIGS. 4C and 4D while the first line end 12 and the second line end 14 are connected to one another in FIGS. 4E and 4F.

In this embodiment, the blocking member 42 of the blocking device 38 is designed as a blocking slot nut 71 and is radially movably supported in the support ring 34. The support ring 3 can have a groove formed complementary to the blocking slot nut 71 for this purpose. For reasons of illustration, only one blocking slot nut 71 is shown, but a total of six blocking slot nuts 71 are provided.

The blocking device 38 further comprises a setting ring 73 that is rotatably supported about the axis of rotation DR on the support ring 34, but fixed along the axis of rotation. The setting ring 73 has the setting surface 66 that likewise has a varying distance from the axis of rotation DR. The blocking slot nut 71 comes into contact with the setting ring 73 at the setting surface 66.

The blocking slot nut 71 is in an open position in FIGS. 4C and 4D in which the second line end 14 can be introduced through the reception opening 36 into the connection device $\mathbf{10_8}$ to bring the second line end 14 into contact with the first line end 12 (FIG. 4C). The setting ring 73 is now rotated about the axis of rotation DR counterclockwise with respect to FIGS. 4C to 4F. Due to the varying distance of the setting surface 66 from the axis of rotation DR, the blocking slot nut 71 is displaced radially inwardly as a result of the rotation of the setting ring, for which purpose the setting surface 66 has inwardly directed sectional surfaces 75 that cooperate with surfaces of the blocking slot nut 71 that are at least sectionally complementary. Both the inwardly directed sectional surfaces 75 and the surfaces of the blocking slot nut 71 cooperating therewith are shaped such that an end position of the blocking slot nut 71 can be defined, which can be seen from a comparison of FIGS. 4D and 4F.

Due to the radially inwardly directed movement, the blocking slot nut 71 comes into contact with the second back face 26 of the second extension 22 and applies a force directed along the axis of rotation DR to the second line end 14, whereby the first line end 12 and the second line end 14 are connected to one another.

The setting ring 71 is rotated in the opposite direction, here that is clockwise, for the release. To apply a radially outwardly directed force to the blocking slot nut 71, the setting surface 66 has radially outwardly directed sectional surfaces 77 that cooperate with corresponding counter-surfaces of the blocking slot nut 71, whereby the blocking slot nut 71 moves radially outwardly.

Figure 5:
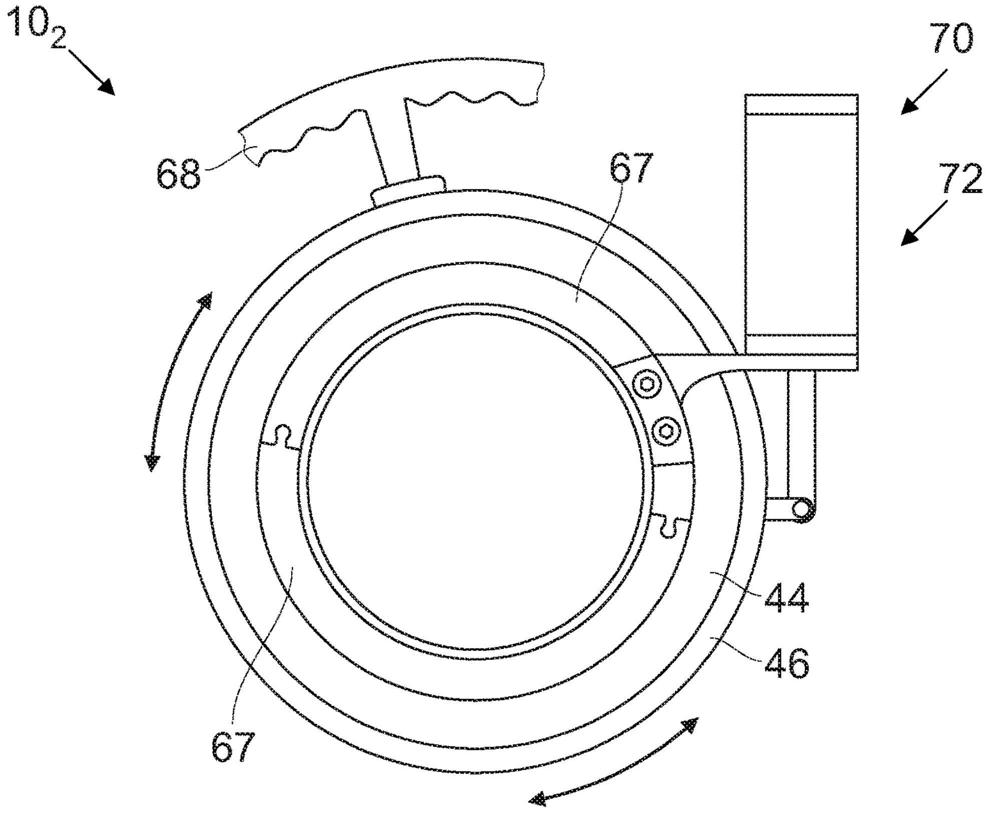
FIG. 5 is a basic plan view of the second embodiment of the connection device.

A basic plan view of the second embodiment of the connection device 102 shown in FIGS. 2A to 2C is shown in FIG. 5. It can be recognized that the support ring 34 is formed by two ring segments 67 that are of the same design and that can be connected to one another with shape matching. As already mentioned, the support ring 34 terminates more or less flush with the first extension 16 in the radial direction so that the first ring 44 can be pushed onto the support ring 34 without it abutting the first extension 16 in so doing. As a result, the first ring 44 can be pushed over the first extension 16 independently of whether the first line end 12 is part of a line fixedly connected to a component, in particular to a container. If, however, the line connected to the first line end 12 is fixedly connected to a container or the like, it is not possible to arrange a single-part support ring 34 behind the first extension 16, viewed from the first front face 18, such that the support ring 34 can be brought into contact with the first back face 20. The use of a two-part or multi-part support ring 34 while forming the ring segments 67 enables this arrangement in contrast.

In addition, the handle piece 40 can be recognized in FIG. 5 that is formed as a hand wheel only shown in part. A drive unit 70 by which it is possible to rotate the second ring 46 about the longitudinal axis L in an automated manner is furthermore fastened to the support ring 34. In the embodiment shown, the drive unit 70 comprises a piston in cylinder unit 72 that can be pneumatically or hydraulically activated, for example.

Figure 6A:
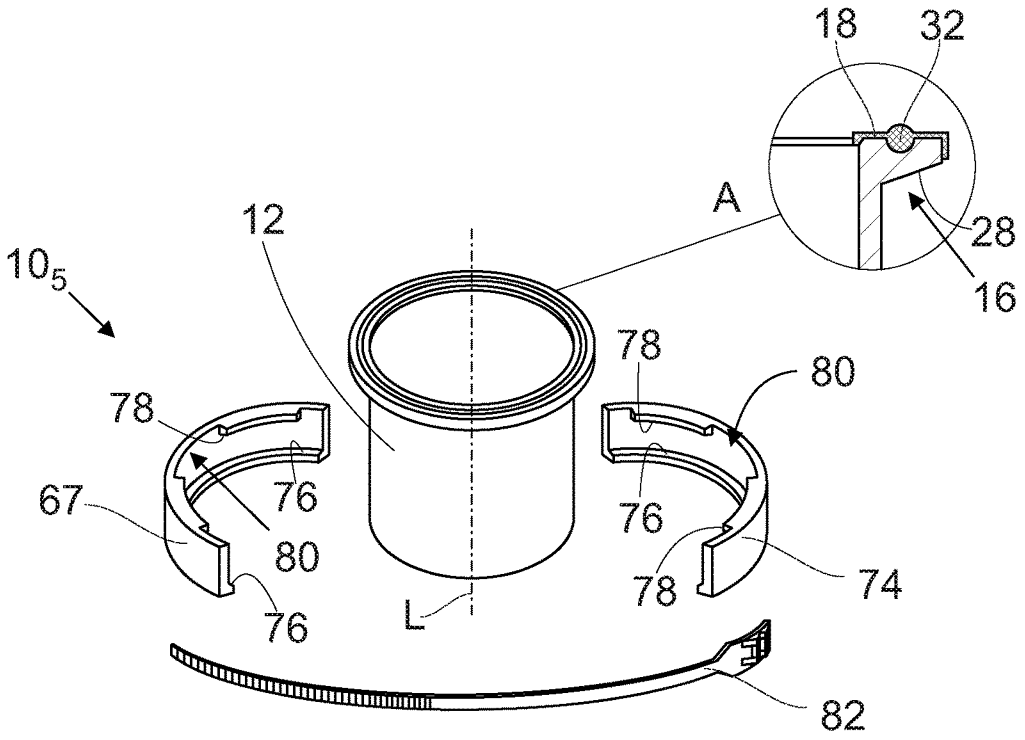
FIG. 6A is a front perspective, partially exploded view of a first line end and a fifth embodiment of the connection device in a starting state and a cross-sectional view of a portion of a first extension of the first line within the Circle A of FIG. 6A.

A fifth embodiment of a connection device $\mathbf{10_5}$ in accordance with a proposal is shown in different states in FIGS. 6A to 6G, with some of the FIGS. 6A to 6G having details A to E shown enlarged. FIG. 6A shows the connection device $\mathbf{10_5}$ is in a starting state. In addition, a first line end 12 is shown that has exactly the same design as the previously described first line ends 12 ghat can be used with a conventional tri-clamp. In addition, it can be recognized in the detail A shown enlarged that a sealing element 32 is connected to the first line end 12 at the first front face 18.

Figure 6B:
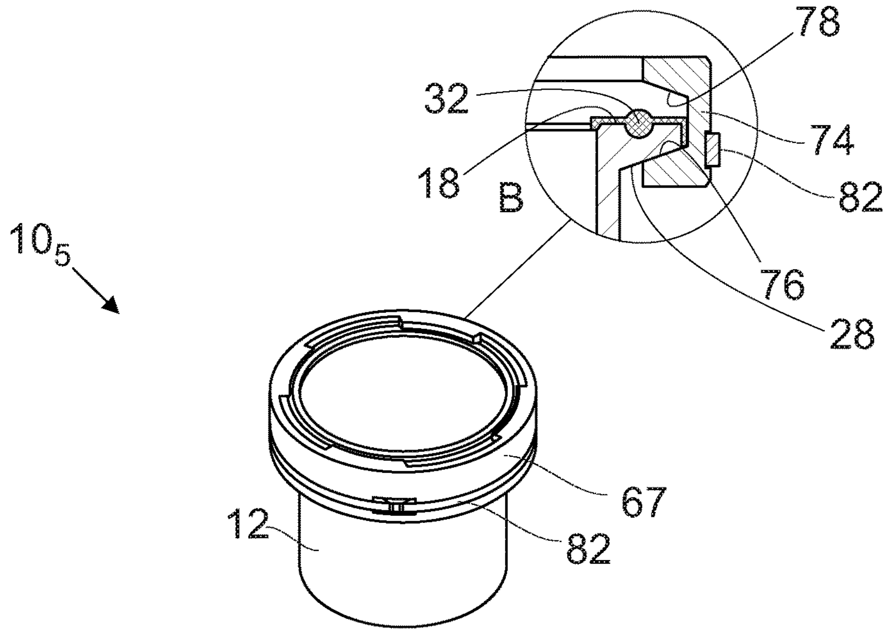
FIG. 6B is front perspective view of the fifth embodiment shown in FIG. 6A in an intermediate state in which the connection device is connected to the first line end and a cross-sectional view of a portion of the fist extension and a connecting ring within circle B of FIG. 6B.

The connection device $\mathbf{10_5}$ in accordance with the fifth embodiment comprises a connection ring 74 that is formed in the embodiment shown by two ring segments 67 that can be connected to one another by means of a cable tie 82, as can be seen from FIG. 6B. The connection ring 74 has a peripheral first closure surface 76 free of interruption radially that is formed corresponding to the first slanted surface 28 of the first extension 16 of the first line end 12. The connection ring 74 furthermore comprises a number of second closure surfaces 78 that are separated from one another by passage sections 80 designed in the manner of a recess. The second closure surfaces 78 have the same inclination as the first closure surfaces 76 as can in particular be recognized from the detail B of FIG. 6B shown enlarged.

Figure 6C:
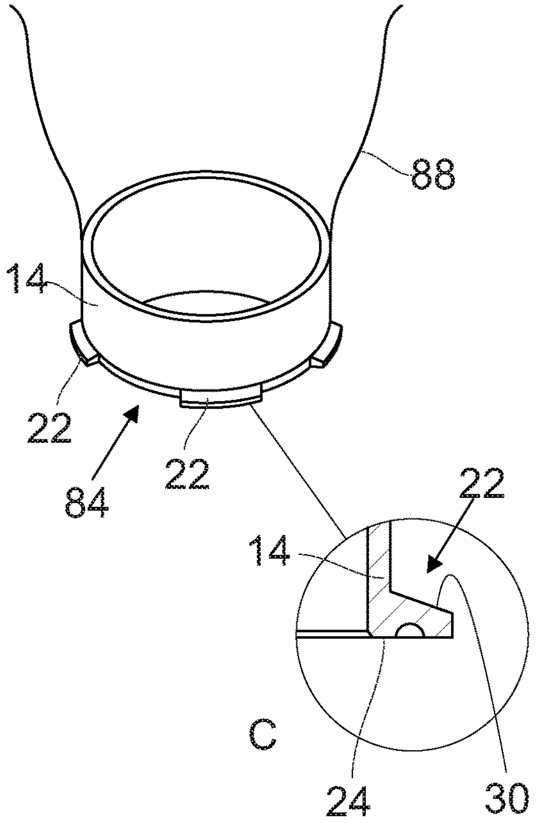
FIG. 6C is a front perspective view of a second line end that is connectable to the connection device in accordance with the fifth embodiment by a first line end and a cross-sectional view of a portion of a second extension of a second line end within Circle C of FIG. 6C.

A second line end 14 is shown in FIG. 6C that has a number of second extensions 22, with the second extensions 22 being separated from one another by interruption sections 84 that are likewise designed in the manner of a recess. In another respect, the second extensions 22 have exactly the same design as the previously described second extensions 22.

To connect the second line end 14 to the first line end 12, the connection ring 74 is first connected to the first line end 12 using the cable tie 82, as is shown in FIG. 6B. The second line end 14 is subsequently arranged coaxially to the first line end 12, with the second line end 14 being brought into a rotational position in which the second extensions 22 can be axially led through the passage sections 80 of the connection ring 74. As soon as the second extensions 22 are behind the second closure surfaces 78 of the connection ring 74 viewed axially, the second line end 14 is rotated so that the second back faces 26 of the second portions 22 can be brought into contact with the second closure surfaces 78 of the connection ring 74. The first line end 12 and the second line end 14 are consequently connected to one another in the manner of a bayonet closure.

Both the second closure surfaces 78 and the second back faces 26 are here inclined in the peripheral direction and are therefore ramp like. This has the consequence that on the rotation of the second line end 14, the latter is also displaced axially toward the first line end 12 so that a sealing contact of the second front face 24 at the sealing element 32 is achieved, as can be seen from FIG. 6D. As a result of this, the first line end 12 and the second line end 14 are sealingly connected to one another.

Figure 6D:
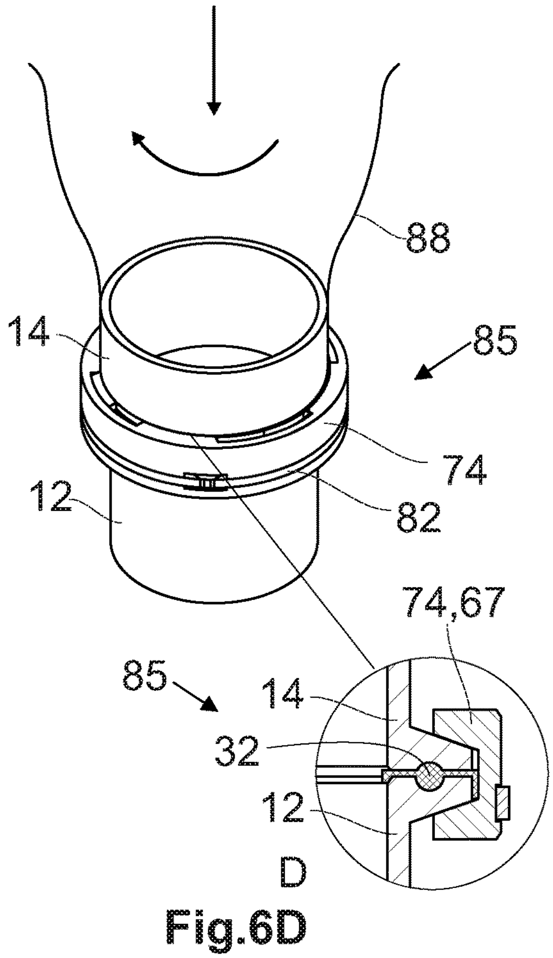
FIG. 6D is a front perspective view of the second line end shown in FIG. 6C that is connected to the connection device in accordance with the fifth embodiment by a first line end and a cross-sectional view of a portion of the first and second line ends within Circle D of FIG. 6D.
Figure 6E:
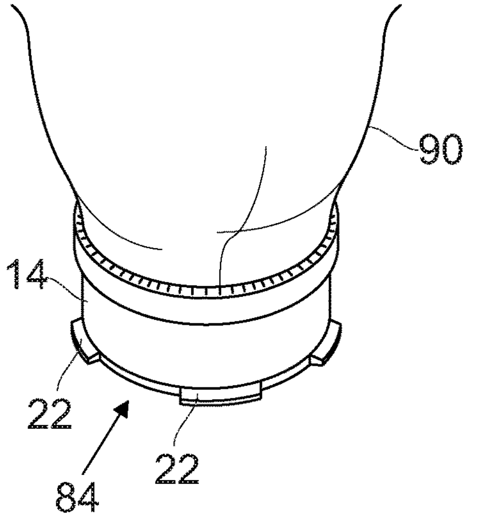
FIG. 6E is a front perspective view of a further second line end that is connectable to the connection device in accordance with the fifth embodiment by a first line end.
Figure 6F:
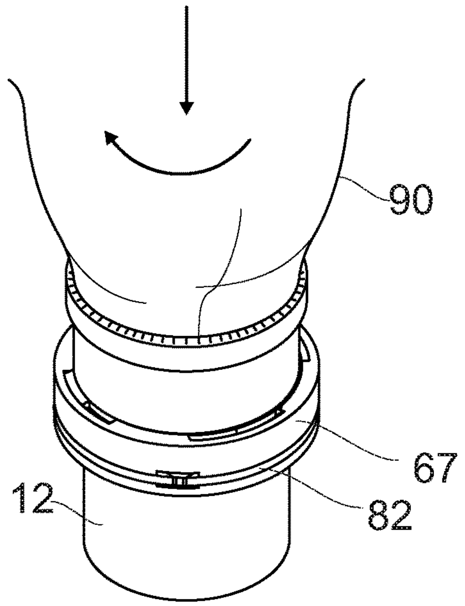
FIG. 6F is a front perspective view of the further second line end shown in FIG. 6E that is connectable to the connection device in accordance with the fifth embodiment by a first line end.

It can be seen from FIGS. 6C and 6D that a flexible sheath 88 is connected to the second line end 14. In FIGS. 6E and 6F a sheath 90 of a different design is connected to the second line end 14. It is therefore possible to connect very different components to the standardized first line end 12 using the connection device $\mathbf{10}_1$.

Figure 6G:
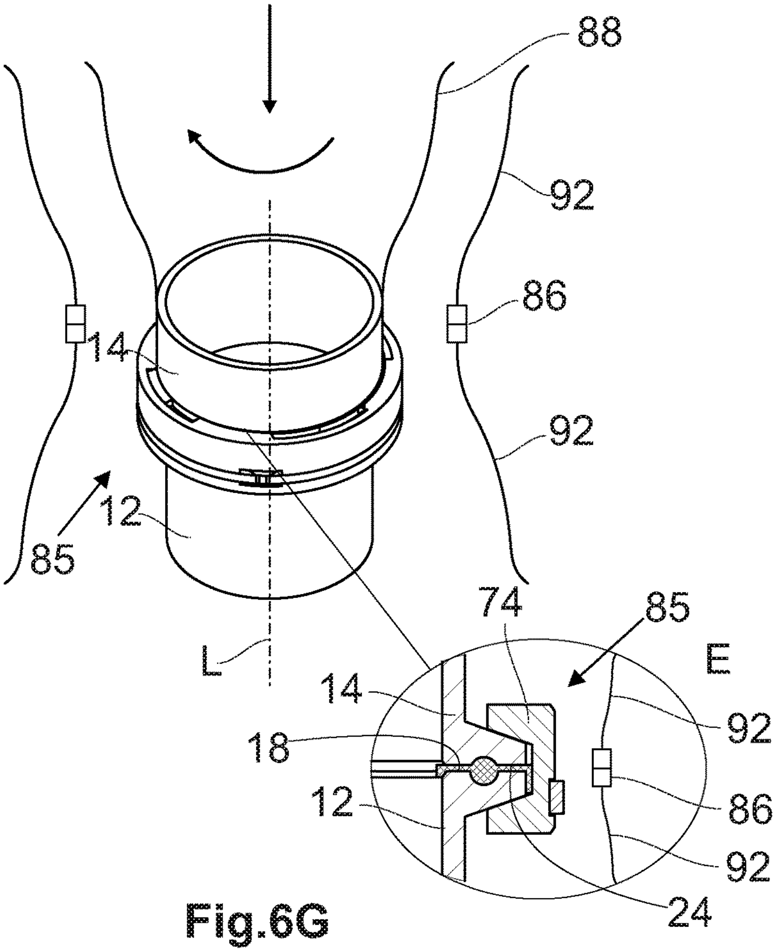
FIG. 6G is a front perspective view of the second line end shown in FIG. 6D that is connected to the connection device in accordance with the fifth embodiment by a first line end, with the connection device being surrounded by a secondary interface and a cross-sectional view of a portion of the first and second line ends and a protective sleeve within Circle E of FIG. 6G.

FIG. 6G shows the first line end 12 shown in FIG. 6D and the second line end 14 in the connected state, with a secondary interface 86 being arranged radially outside the connection device $\mathbf{10}_5$. The secondary interface 86 connects two tubular protective sleeves 92, whereby it can be prevented that a substance that should escape from the first line end 12 or the second line end 14 in the region of the connection device $\mathbf{10}_5$ from being able to enter int the environment in an uncontrolled manner. The secondary interface 86 and the protective sleeves 92 an analogously also be used for the connection devices $\mathbf{10}_1$ to $\mathbf{10}_4$ in accordance with the first embodiment to the fourth embodiment.

Figure 7:
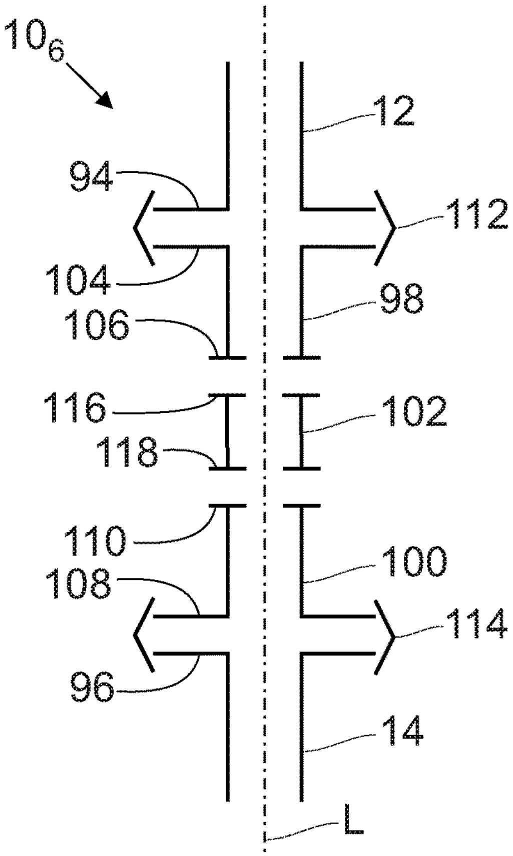
FIG. 7 is a basic representation of a connection device in accordance with a sixth embodiment.

A basic representation of a sixth embodiment of a connection device $\mathbf{10}_6$ in accordance with the invention is shown in FIG. 7. The first line end 12 has a first connection section 94 and the second line end 14 has a second connection section 96. The connection device $\mathbf{10}_6$ in accordance with the sixth embodiment comprises a first connection member 98, a second connection member 100, and a locking member 102.

The first connection member 98 forms a first counter-connection section 104 at one end and a first locking section 106 at an oppositely disposed end. The second connection member 100 correspondingly forms a second counter-connection section 108 at one end and a second locking section 110 at an oppositely disposed end.

The first connection member 98 is connectable or connected to the first line end 12 using the first connection section 94 and the first counter-connection section 104. Suitable first connection means 112 can be used for this purpose.

The second connection member 100 is correspondingly connectable or connected to the second line end 14 using the second connection section 96 and the second counter-connection section 108, for which purpose a suitable second connection means 114 is used.

The locking member 102 that defines a longitudinal axis L forms a first counter-locking section 116 at a first end and a second counter-locking section 118 at a second end. The locking member 102 can be connected to the first connection member 98 by the first counter-locking section 116 using the first locking section 108. Analogously to this, the locking member 102 can be connected to the second connection member 100 by the second counter-locking section 118 of using the second locking section 110.

In this respect, the first locking section 106 and the first counter-locking section 116 are designed such that the connection can be connected to one another by a translatory relative movement of the locking member 102 and/or of the first connection member 98 along the longitudinal axis L. Alternatively or accumulatively to this, a rotational movement about the longitudinal axis L may be necessary to connect the first connection member 98 to the locking member 102.

The second locking section 110 and the second counter-locking section 118 can likewise be correspondingly formed.

Figure 8A:
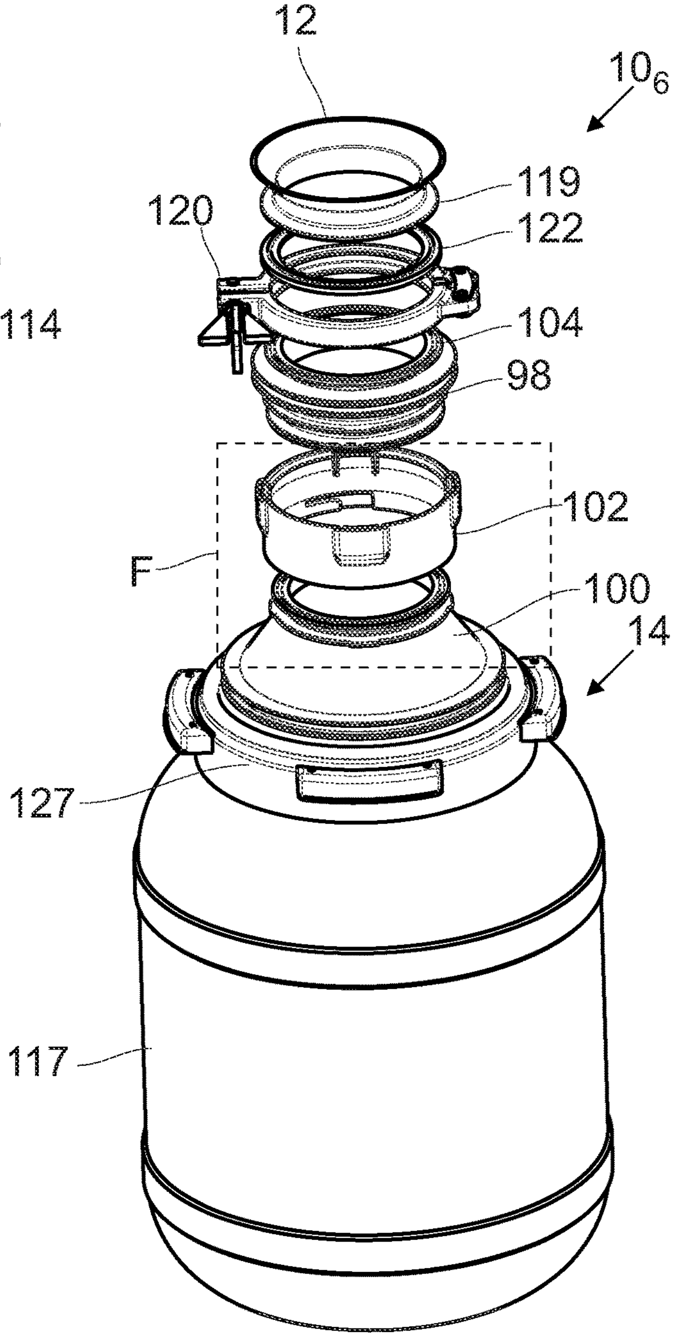
FIG. 8A is a front perspective, partially exploded view of a connection device in accordance with a sixth preferred embodiment.
Figure 8B:
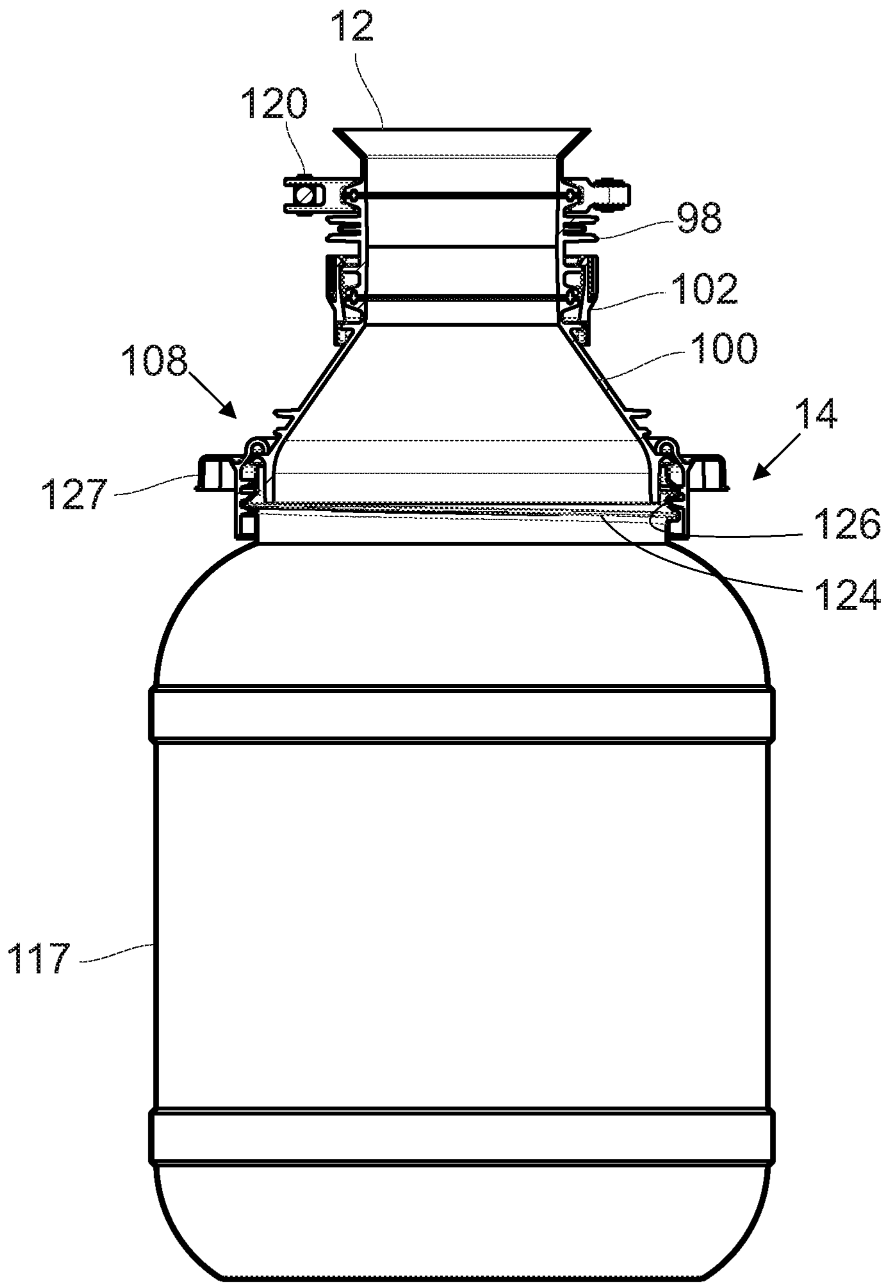
FIG. 8B is a cross-sectional view of the connection device of FIG. 8A.

A connection device $\mathbf{10}_6$ in accordance with the sixth embodiment is shown in different views in FIGS. 8A to 8F. FIG. 8A shows an exploded representation of the connection device $\mathbf{10}_6$ while FIG. 8B shows the connection device $\mathbf{10}_6$ in the connected state. If not otherwise noted, the following description relates equally to FIGS. 8A and 8B. The first line end 12 is formed in this case by a short funnel-like line and can establish the connection to a process space, not shown, while the second line end 14 is formed by a container 117. The first connection section 94 and the first counter-connection section 104 are formed as tri-clamp stubs 119 so that the first line end 12 and the first connection member 98 can be connected to one another by the first connection means 112 formed as a tri-clamp 120. A seal 122 is arranged therebetween to seal the connection between the first line end 12 and the first connection member 98.

As can in particular be seen from FIG. 8B, the second connection section 96 is formed as an external screw thread 124, with the second connection section 96 having a larger diameter in comparison with the first connection section 94. The second connection member 100 is designed as funnel-like to bridge the diameter difference. In the embodiment shown, however, the second counter connection section 108 is not designed as an internal screw thread 126 so that the second connection member 100 cannot be screwed onto the container 117. To nevertheless be able to establish the connection to the container 117, the second connection means 114 comprises a second adapter 127 that can be pushed over the second connection member 100 due to its funnel-like design and can be brought into engagement therewith, for which purpose the second connection member 100 has contact surfaces 128 (see FIG. 8C). The second adapter 127 has an internal screw thread 126 that is complementary to the external screw thread 124; as a result, the second adapter can be screwed onto the container 117. The second adapter 127 can be produced in that an opening that is so large that the cover can be brought over the contact surface 128 is worked into the actual cover that is screwed onto the container 117.

Figure 8C:
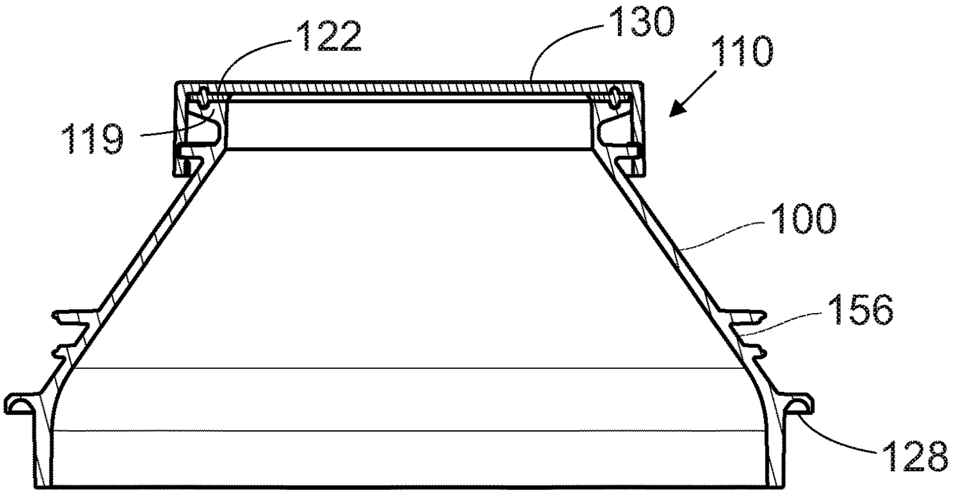
FIG. 8C is a cross-sectional view of a second locking section of the connection device of FIG. 8A.
Figure 8D:
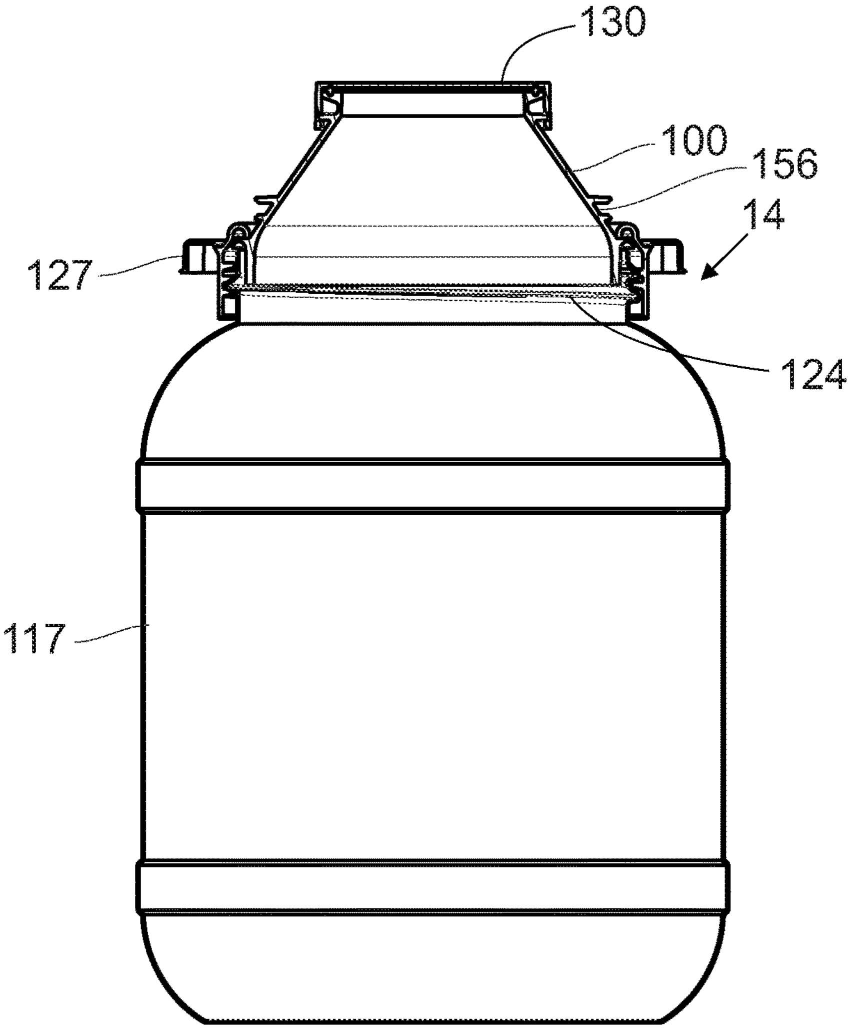
FIG. 8D is a front perspective view of the connection device of FIG. 8A.

It can likewise be seen from FIG. 8C, that shows the second connection member 100 in isolation, but also from FIG. 8D that the second connection member 100 is closed by a cover 130. The manner in which the cover 130 is connected to the second connection member 100 will be looked at more exactly further below. In FIG. 8D, the second connection member 100 closed by the cover 130 is connected to the container 117 using the second adapter 127, while in FIG. 8B the cover 130 has been removed and the second connection member 100 is connected to the locking member 102. The locking member 102 is additionally connected to the first connection member 98 that, as mentioned, is connected to the first line end 12 by means of the tri-clamps 120. The first line end 12 and the second line end 14 are consequently connected to one another using the connection device $\mathbf{10}_6$.

Figure 8E:
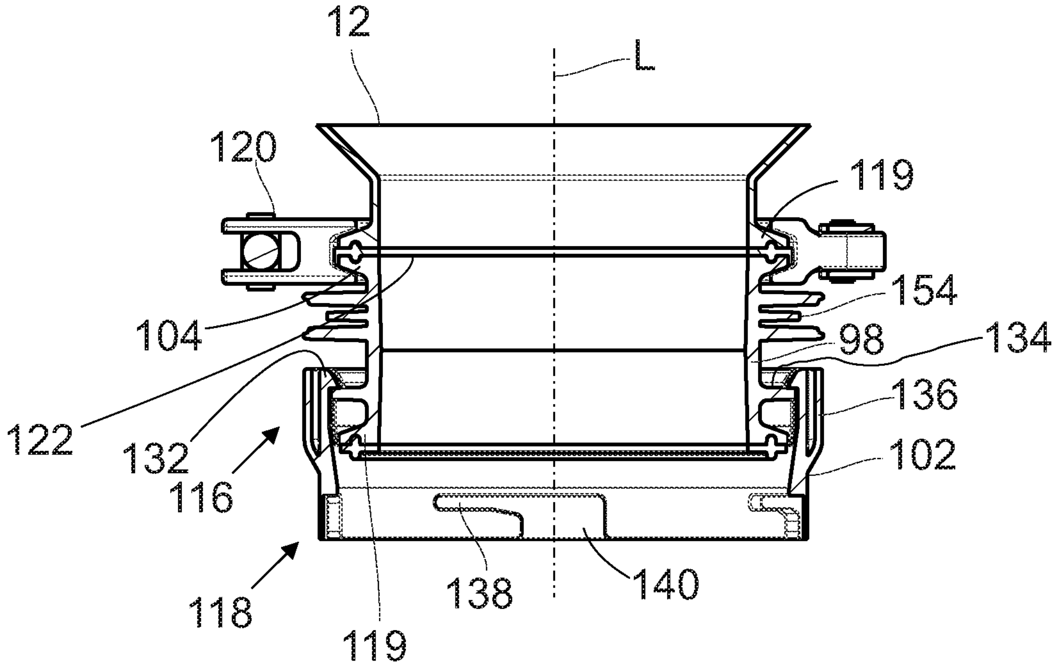
FIG. 8E is a cross-sectional view of a portion of the connection device of FIG. 8A.

How the locking member 102 is connected to the first connection member 98 can in particular be seen from the sectional representation of FIG. 8E. The first counter-locking section 116 has a plurality of hooks 132 that are movable radially to the longitudinal axis L. The first connection member 98 furthermore has closure surfaces 134 that are engaged behind by the hooks 132, as is shown in FIG. 8E, as a result of a translatory movement of the first connection member 98 and of the locking member 102 along the longitudinal axis L. The hooks 132 are radially outwardly deflected and are reversibly elastically deformed during this translatory movement. They subsequently return to the starting position. A shape matched connection between the first connection member 98 and the locking member 102 is consequently established.

Figure 8F:
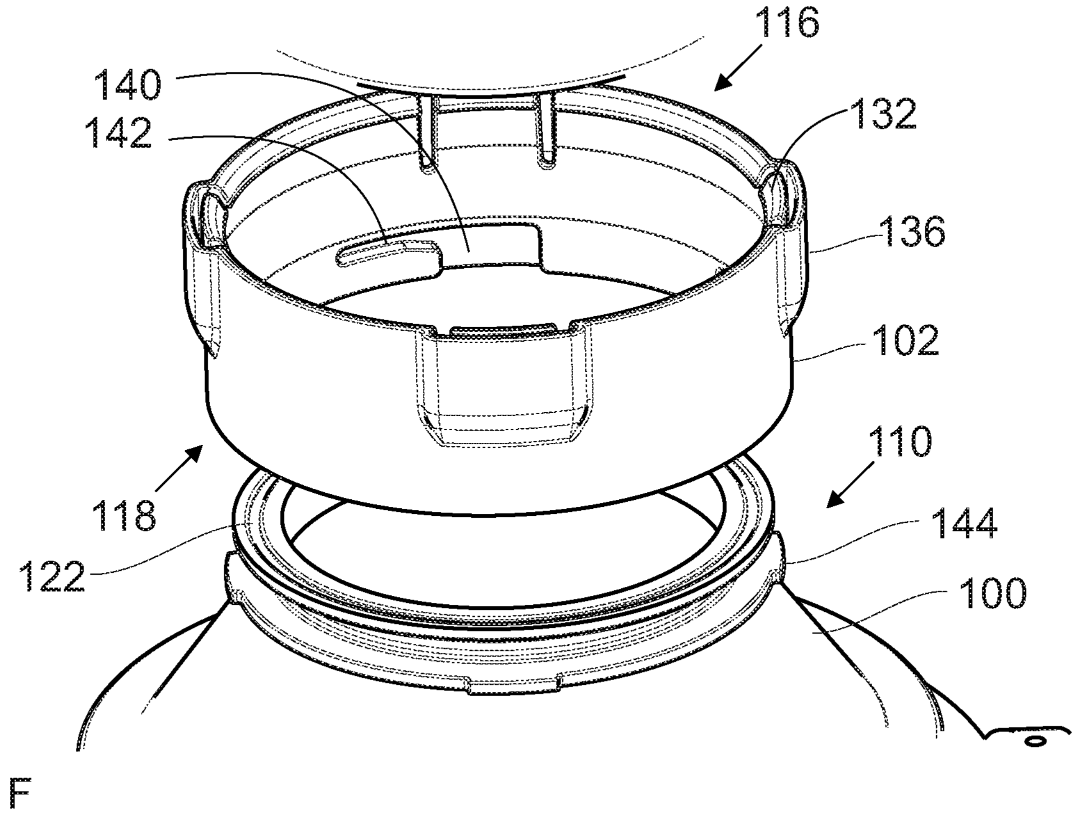
FIG. 8F is a front perspective view of a locking member and a portion of a second locking section of the connection device of FIG. 8A.

It can in particular be recognized from FIG. 8F, that shows the detail F marked in FIG. 8A in enlarged form, that the locking member 102 has a total of four bulges 136 that project outwardly from the remaining locking member 102 radially to the longitudinal axis L. The hooks 132 are surrounded by the bulges 136, with the bulges 136 allowing the radial movement of the hooks 132 up to a certain limit that is necessary to engage behind the closure surfaces 134.

Both FIG. 8E and FIG. 8F show that the second counter-locking section 118 comprises four recesses 138 in this case that form an introduction region 140 extending substantially along the longitudinal axis L and a locking region 142 starting therefrom and extending substantially in the peripheral direction. The introduction region 140 is arranged approximately along the longitudinal axis L flush with the bulges 136.

FIG. 8 further shows that the second locking section 110 of the second connection member 100 is provided with four locking prolongations 144 that can be introduced into the four recesses 138. The connection between the second connection member 100 and the locking member 102 can consequently be established by means of a translatory relative movement along the longitudinal axis L, followed by a rotational relative movement about the longitudinal axis L.

Figure 9A:
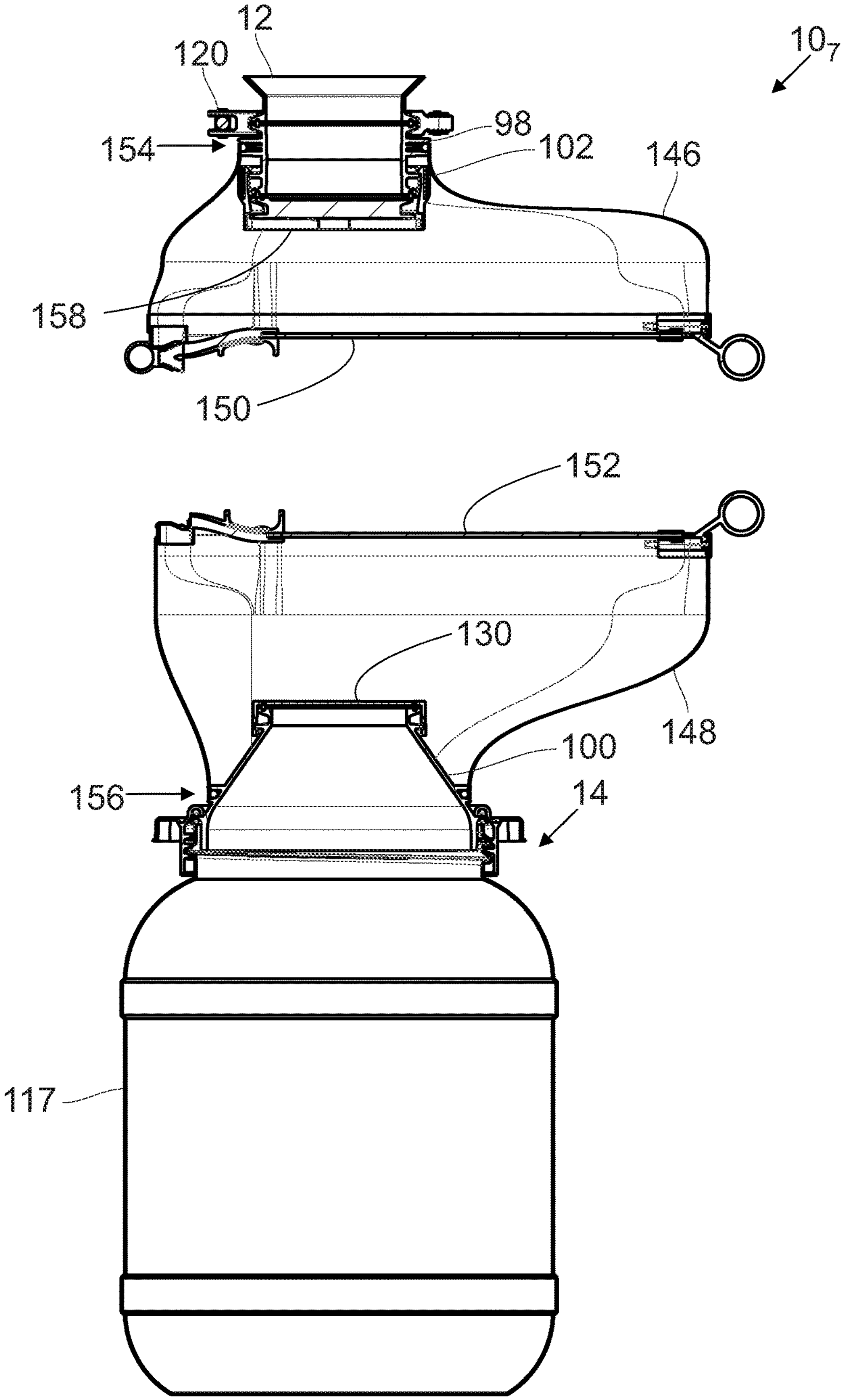
FIG. 9A is a front elevational, partially exploded view of a container and a connection device in accordance with a seventh preferred embodiment of the present invention.
Figure 9B:
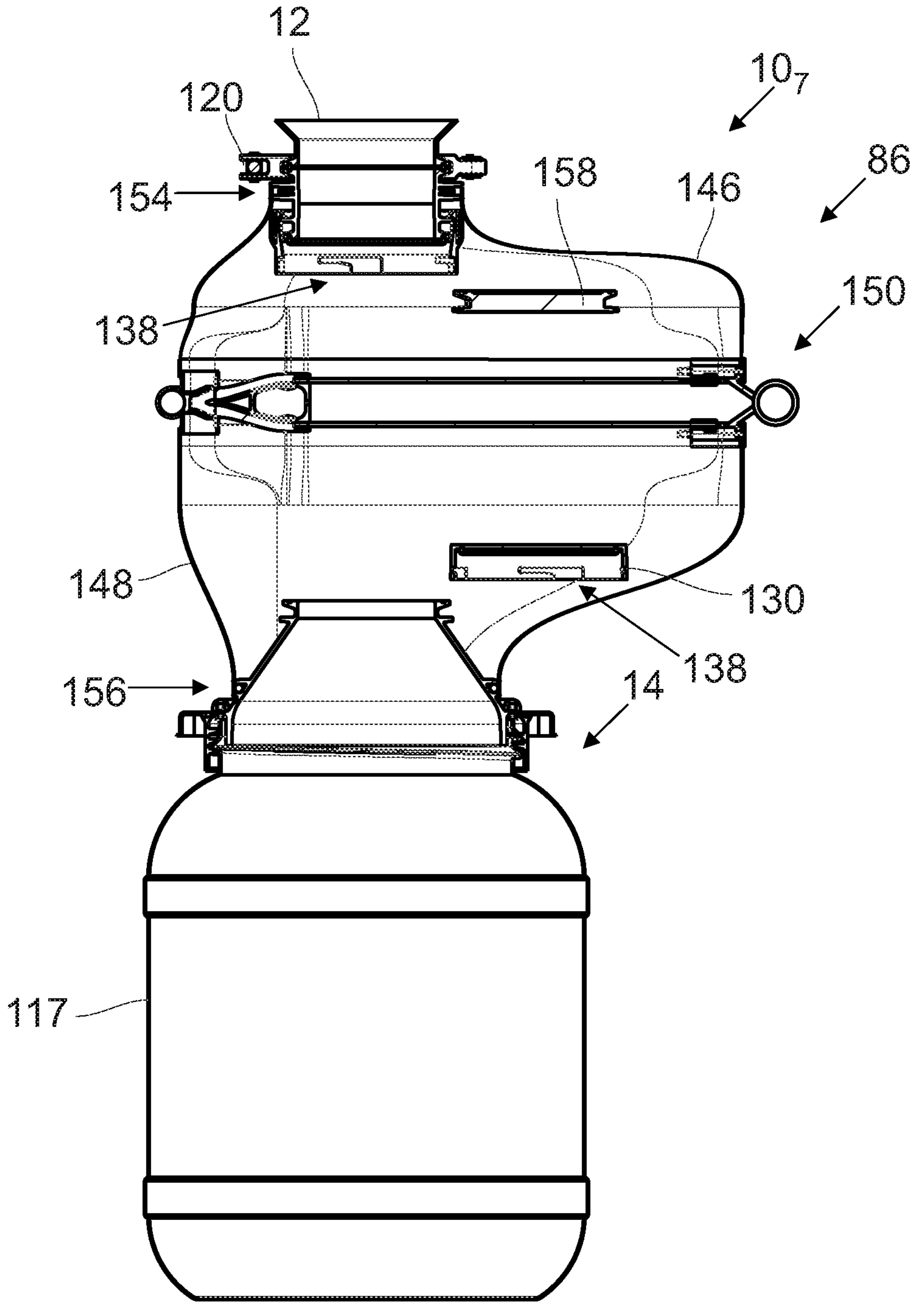
FIG. 9B is a front elevational view of the container and connection device of FIG. 9A.

As can in particular be seen from FIG. 9B, the cover 130 likewise has the recesses 138 like the second counter-locking section 118 so that the cover 110 can be connected to the second connection member in the same way as the locking member 102.

The second locking section 110 and the first connection member 98 comprise tri-clamp stubs 119 (see in particular FIGS. 8B, 8C, and 8E) that have a reception for a seal 122 to seal the connection between the second connection member 100 and the locking member 102. The seal 122 is identical to the one that is used to seal the connection between the first line end 12 and the first connection member 98. The tri-clamp stubs 119 are also identical.

The connection of the first line end 12 to the container 117 that forms the second line end 14 follows the procedure: First, a cover, not shown here, of the container 117—provided one is present at all—is unscrewed from the container 117 and the second connection member 100 is screwed to the container 117 using the second adapter 127. The second connection member 100 can here be closed by the cover 130 at the second locking section 110 (see FIGS. 8C and 8D, for example).

The first line end 12 is connected to the first connection member 98 using the tri-clamp 120, as shown in FIG. 8E.

The locking member 102 is subsequently connected to the first connection member 98 by means of a relative movement directed along the longitudinal axis L so that the state shown in FIG. 8E is present. The cover 130 is now removed from the second locking section 110 of the second connection member 100 and the second connection member 100 and the locking member 102 are moved toward one another by a translatory movement so that the second locking prolongations 144 engage into the introduction region 140 of the recesses 138. Subsequently, a relative rotational movement about the longitudinal axis L is carried out, whereby the second locking prolongations 144 are moved into the locking region 142 of the recesses 138. The first line end 12 and the second line end 14 are now connected to one another, as shown in FIG. 8B.

FIGS. 9A and 9B show a seventh embodiment of the connection device 107 in accordance with the invention that is largely identical to the connection device 106 in accordance with the sixth embodiment. However, a first tubular protective sleeve 100 is fastened to the first connection member 98 and a second tubular protective sleeve 148 is fastened to the second connection member 100. For this purpose, the first connection member 98 is equipped with a first reception section 154 (see in particular FIG. 8E) and the second connection member 100 is equipped with a second reception section 156 (see in particular FIG. 8C). The first tubular protective sleeve 148 has a first closure unit 150 and the second tubular protective sleeve 148 has a second closure unit 152 that can be connected to one another to form a secondary interface 86. The first closure unit 150 and the second closure unit 152 can be configured as described in WO 2019/175121 A1.

In the state shown in FIG. 9A, the first connection member 98 is connected to the first line end 12 in the manner described for the sixth embodiment of the connection device $\mathbf{10}_6$. It is again not shown that the first line end 12 is connected to a process space, for example of a reactor.

In addition, the locking member 102 is connected to the first connection member 98 in the described manner. In the second counter-locking section 118, the locking member 102 is closed by a closure 158 that likewise has the locking prolongation 144 not recognizable here so that the former can engage into the recesses 138 of the second locking section 110 as described for the second connection member 100.

The second connection member 100 is closed by the already mentioned cover 130 in the described manner.

The first closure unit 150 closes the first tubular protective sleeve 146 so that the locking member 102 is closed, on the one hand, by the closure 158 and, on the other hand, by the first tubular protective sleeve 146.

The second connection member 100 is closed by the already mentioned cover 130 in the described manner. Furthermore, the second connection member 100 is connected to the second tubular protective sleeve 148 closed by the second closure unit 152.

The first closure unit 150 and the second closure unit 152 are connected to one another in FIG. 9B. In brief, using a slider unit not separately shown here, that is slidable from one end to the other end in a similar manner to a zipper, on the one hand, the first closure unit 150 and the second closure unit 152 are connected to one another, on the other hand, the first tubular protective sleeve 144 and the second tubular protective sleeve 148 are simultaneously opened so that a passage channel is created between the first tubular protective sleeve 146 and the second tubular protective sleeve 148. From the outside, a user can remove the closure form the latching member 102 and the cover 130 from the second connection member 100, with the first tubular protective sleeve 146 and the second tubular protective sleeve 148 being correspondingly deformed, which is harmless. The closure 158 and the cover 130 here remain within the space surrounded by the first tubular protective sleeve 146 and the second tubular protective sleeve 148. The locking member 102 and the second connection member 100 can subsequently be connected to one another in the manner described for the sixth embodiment of the connection device $10_6$ so that the state shown in FIG. 8B is established in which the first line end 12 and the second line end 14 are connected to one another, but with the connection device $10_6$ being surrounded by the first tubular protective sleeve 149 and the second tubular protective sleeve 148. A secondary interface 86 is hereby created that is in particular used when it has to be avoided that even very small amounts of a substance might enter into the environment.

The order of the procedure is reversed to disconnect the first line end 14 from the second line end 14.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

REFERENCE NUMERAL LIST

10 connection device
$10_1$-$10_8$ connection device
12 first line end
14 second line end
16 first extension
18 first front face
20 first back face
22 second extension
24 second front face
26 second back face
28 first slanted surface
30 second slanted surface
32 sealing element
34 support ring
36 reception opening
38 blocking device
40 grip piece
42 blocking member
44 first ring
46 second ring
48 latch connection
50 latch means
52 security against rotation
54 blocking pin
56 blind hole bore
57 bore
58 collar
60 first preload means
62 second preload means
64 blocking ball
64 groove
65 spring
66 setting surface
67 ring segment
68 hand wheel
69 stop element
70 drive unit
71 blocking slot nut
72 piston in cylinder unit
73 setting ring
74 connection ring
75 inwardly directed sectional surfaces
76 first closure surface
77 outwardly directed sectional surfaces
78 second closure surface
80 passage section
82 cable tie
84 interruption sections
86 secondary interface
88 flexible sheath
90 sheath
92 protective sleeve
94 first connection section
96 second connection section
98 first connection member
100 second connection member
102 locking member
104 first counter-connection section
106 first locking section
108 second counter-connection section
110 second locking section
112 first connection means
114 second connection means
116 first counter-locking section
117 container
118 second counter-locking section
119 tri-clamp stubs
120 tri-clamp
122 seal
124 external screw thread
126 internal screw thread
127 second adapter
128 contact surface
130 cover
132 hook
114 closure surfaces
136 bulge
138 recess
140 introduction region
142 locking region
144 locking prolongation
146 first tubular protective sleeve
148 second tubular protective sleeve
150 first closure unit
152 second closure unit
154 first reception section
156 second reception section
158 closure
A-F detail
DS axis of rotation, blocking member
DR axis of rotation, second ring, setting ring
L longitudinal axis

The invention claimed is:

1. A connection device for connecting a first line end to a second line end, wherein the first line end has a first connection section and the second line end has a second connection section; and the connection device comprises:
- a first connection member having
  - a first counter-connection section, with the first connection member being connectable or connected to the first line end using the first connection section and the first counter-connection section; and
  - a first locking section;
- a second connection member having
  - a second counter-connection section, with the second connection member being connectable or connected to the second line end using the second connection section and the second counter-connection section; and
  - a second locking section;
- the first connection section and the first counter-connection section are designed as tri-clamp stubs; and/or the second connection section and the second counter-connection section are designed as tri-clamp stubs;

a locking member that defines a longitudinal axis and having a first counter-locking section by which the locking member is connectable using the first locking section to the first connection member by means of a translatory movement along the longitudinal axis and/or a rotational movement about the longitudinal axis; and having a second counter-locking section by which the locking member is connectable using the second locking section to the second connection member by means of a translatory movement along the longitudinal axis and/or a rotational relative movement about the longitudinal axis, wherein the connection between the locking member and the first connection member; and/or the locking member and the first connection member is releasable.

2. A connection device in accordance with claim 1, wherein the first counter-locking section has hooks movable radially to the longitudinal axis; and the first locking section has first closure surfaces, wherein the hooks are first moved outwardly radially to the longitudinal axis in the first locking section and subsequently engage behind the first closure surfaces due to a translatory relative movement along the longitudinal axis.

3. A connection device in accordance with claim 2, wherein—the locking member has bulges projecting outwardly radially to the longitudinal axis and the hooks are surrounded by the bulges.

4. A connection device in accordance with claim 1, wherein the second counter-locking section has recesses with an introduction region and a locking region; and the second locking section has second locking prolongations, wherein the locking prolongations can first be introduced into the introduction region due to a translatory movement along the longitudinal axis and subsequently into the locking region due to a rotational movement about the longitudinal axis.

5. A connection device in accordance with claim 1, wherein second closure surfaces and/or second connection members are funnel shaped.

6. A connection device in accordance with claim 1, wherein a first adapter is connectable to the first counter-connection section to form the connection with the first connection section; and/or a second adapter is connectable to the second counter-connection section to form a connection with the second connection section.

7. A connection device in accordance with claim 1, wherein the first connection member has a first reception section for receiving a first tubular protective sleeve; and the second first connection member has a second reception section for receiving a second tubular protective sleeve.

8. A connection device in accordance with claim 1, wherein the first counter-locking section has first closure surfaces; and the first locking section has hooks movable radially to the longitudinal axis, wherein the hooks are first moved outwardly radially to the longitudinal axis in the first locking section and subsequently engage behind the first closure surfaces due to a translatory relative movement along the longitudinal axis.

9. A connection device in accordance with claim 1, wherein the second counter-locking section has second locking prolongations; and the second locking section has recesses with an introduction region and a locking region, wherein the locking prolongations can first be introduced into the introduction region due to a translatory movement along the longitudinal axis and subsequently into the locking region due to a rotational movement about the longitudinal axis.

* * * * *